(12) United States Patent
Thacker, II

(10) Patent No.: US 8,894,348 B2
(45) Date of Patent: Nov. 25, 2014

(54) WIND TURBINE

(76) Inventor: Andrew Carlton Thacker, II, Lakewood, CO (US)

(*) Notice: Subject to any disclaimer, the term of this patent is extended or adjusted under 35 U.S.C. 154(b) by 0 days.

(21) Appl. No.: 13/635,612

(22) PCT Filed: Mar. 11, 2011

(86) PCT No.: PCT/US2011/028161
§ 371 (c)(1), (2), (4) Date: Feb. 4, 2013

(87) PCT Pub. No.: WO2011/115845
PCT Pub. Date: Sep. 22, 2011

(65) Prior Publication Data
US 2013/0129472 A1 May 23, 2013

Related U.S. Application Data

(63) Continuation of application No. 13/039,954, filed on Mar. 3, 2011, now abandoned.

(60) Provisional application No. 61/314,104, filed on Mar. 15, 2011.

(51) Int. Cl.
| F03D 7/06 | (2006.01) |
| F03D 3/02 | (2006.01) |
| F03D 3/04 | (2006.01) |
| F03D 11/04 | (2006.01) |
| H02P 9/04 | (2006.01) |
| F03D 7/02 | (2006.01) |
| H02P 9/00 | (2006.01) |

(52) U.S. Cl.
CPC .......... *F03D 11/04* (2013.01); *H02P 2009/004* (2013.01); *Y02E 10/74* (2013.01); *Y02B 10/30* (2013.01); *F05B 2270/321* (2013.01); *F05B 2270/32* (2013.01); *F03D 3/0472* (2013.01); *H02P 9/04* (2013.01); *F05B 2240/911* (2013.01); *F03D 7/0204* (2013.01); *Y02E 10/728* (2013.01)
USPC ................ 415/4.4; 416/128; 415/60

(58) Field of Classification Search
CPC .............................. F03D 3/0427; Y02E 10/74
USPC .............. 290/44, 55; 415/4.2, 4.4, 60, 61, 66, 415/907, 908, 909; 416/41, 117, 120, 124, 416/125, 128, 131, 135
See application file for complete search history.

(56) References Cited

U.S. PATENT DOCUMENTS

| 372,148 A | 10/1887 | Henderson |
| 3,920,354 A | 11/1975 | Decker |
| (Continued) |

FOREIGN PATENT DOCUMENTS

WO WO 2010/021731 2/2010

OTHER PUBLICATIONS

International Search Report and Written Opinion for International (PCT) Patent Application No. PCT/US2011/028161, mailed May 20, 2011, 11 pages.

(Continued)

*Primary Examiner* — Ned Landrum
*Assistant Examiner* — Ryan Ellis
(74) *Attorney, Agent, or Firm* — Sheridan Ross P.C.

(57) ABSTRACT

Wind turbine systems and methods are provided. The wind turbine system includes a plurality of coaxial, counter-rotating turbine assemblies. First and second shroud assemblies define a generally spherical volume containing the first and second turbine assemblies. The first and second shroud assemblies each include a shroud member that can selectively shield or expose portions of the respective turbine assemblies to the wind by changing the rotational position of the shroud members about the system axis. The turbine assemblies are interconnected to a generator for the production of electrical power.

20 Claims, 20 Drawing Sheets

(56) References Cited

U.S. PATENT DOCUMENTS

| | | | |
|---|---|---|---|
| 4,012,163 A * | 3/1977 | Baumgartner et al. | 415/208.3 |
| 4,052,134 A * | 10/1977 | Rumsey | 416/119 |
| 4,237,384 A | 12/1980 | Kennon | |
| 4,456,429 A * | 6/1984 | Kelland | 416/117 |
| 4,474,529 A * | 10/1984 | Kinsey | 415/4.2 |
| 4,850,792 A | 7/1989 | Yeoman | |
| 5,083,039 A | 1/1992 | Richardson et al. | |
| 5,391,926 A | 2/1995 | Staley et al. | |
| 5,503,530 A | 4/1996 | Walters | |
| 5,947,678 A * | 9/1999 | Bergstein | 415/3.1 |
| 6,191,496 B1 | 2/2001 | Elder | |
| 6,538,340 B2 | 3/2003 | Elder | |
| 6,808,366 B2 * | 10/2004 | Sikes | 416/1 |
| 6,993,965 B2 | 2/2006 | Yoshida | |
| 7,160,083 B2 * | 1/2007 | Pierce et al. | 416/61 |
| 7,355,294 B2 | 4/2008 | Teichmann | |
| 7,540,705 B2 | 6/2009 | Emshey | |
| 7,713,020 B2 | 5/2010 | Davidson et al. | |
| 8,154,141 B2 * | 4/2012 | Andresen | 290/44 |
| 8,487,470 B2 * | 7/2013 | Grassman | 290/55 |
| 2005/0042095 A1 | 2/2005 | Kaliski | |
| 2008/0007068 A1 * | 1/2008 | Ward | 290/55 |
| 2008/0150292 A1 | 6/2008 | Fedor et al. | |
| 2009/0142192 A1 | 6/2009 | LeClair et al. | |
| 2010/0129219 A1 * | 5/2010 | Grewal | 416/128 |
| 2010/0251539 A1 | 10/2010 | Gizaw et al. | |
| 2010/0296913 A1 | 11/2010 | Lee | |
| 2011/0156392 A1 | 6/2011 | Thacker, II | |
| 2011/0158787 A1 | 6/2011 | Thacker, II | |
| 2013/0119662 A1 | 5/2013 | Thacker, II | |

OTHER PUBLICATIONS

International Preliminary Report of Patentability for International (PCT) Patent Application No. PCT/US2011/028161, mailed Sep. 27, 2012, 10 pages.

International Search Report and Written Opinion for International (PCT) Patent Application No. PCT/US2011/028158, mailed May 10, 2011, 9 pages.

International Preliminary Report on Patentability for International (PCT) Patent Application No. PCT/2011/028158, mailed Sep. 27, 2012, 8 pages.

Official Action for U.S. Appl. No. 13/039,951, mailed May 10, 2011, 13 pages.

Official Action for U.S. Appl. No. 13/039,951, mailed Jul. 29, 2011, 18 pages.

Official Action for U.S. Appl. No. 13/039,951, mailed Nov. 22, 2011, 19 pages.

Official Action for U.S. Appl. No. 13/039,954, mailed Mar. 7, 2012, 22 pages.

* cited by examiner

WIND TURBINE

FIELD

The present invention is directed to wind turbine systems and methods. More particularly, the present invention relates to wind turbine systems and methods that utilize counter-rotating turbine assemblies.

BACKGROUND

Several decades of development have focused on harnessing the power of the wind to turn water and grist mills, and since the invention by Westinghouse in the late 1800's, to produce electrical power. Many types of designs have been proffered, however, they have been focused almost entirely on horizontal turbines with blades, sails or propellers to convert the kinetic energy of wind into a force to drive various types of electrical generators, including alternating current (AC), direct current (DC) and 3-phase current for storing and using power as the demand presents itself or to provide power directly into the public and private utility grids for distribution from substations to homes, offices, hotels, casinos, cities and municipalities, industrial and other energy dependent user applications.

The past 20 years has seen a much greater emphasis on renewable energy sources as alternatives to fossil fuel power plants burning coal, natural gas, fuel oil or nuclear fuels to produce steam to power large scale electrical generators to reduce the impact of carbon compounds upon the Earth's atmosphere. These efforts have primarily been directed to large scale utility grids and the emphasis has been on large scale production systems (wind farms) greater than 1 megawatt that are geographically concentrated in remote locations where wind is available. It is now common to see systems greater than 4 megawatts in one tower. The systems developed can cost multi-million dollars each. The systems can be highly complex, enormous in size and scale and number in the tens of thousands in North America and world-wide. Towers of 200-400 feet in height are common on prairies and savannas, along our coastal regions, and even off-shore in shallow ocean waters. It was thought that these systems would have an enormous impact in offsetting the use of carbon based fuels and provide a cheap source of unlimited power.

Unfortunately, this has not been the case and large utilities are now rethinking their use of these systems due to several inherent problems with the design and deployment of the systems. Among the problems impacting these systems are variations in wind speeds over the sweep of the propellers (60 ft-450 ft), ground turbulence that causes prop dithering and imbalance, and gusting winds that apply uneven forces and torqueing of the drive axles which have resulted in expensive and time consuming repairs of system mechanical drive trains and transmissions which cannot respond quickly to these changing dynamic loads. Other problems include overheating of the turbines resulting in transmission system and hydraulic system fires, wind loads that have caused complete system failure and total collapse of the towers, flickering light patterns disturbing cattle and other livestock, and complaints from people living near the turbines with regard to noise, bird kills, and flickering light patterns in their home windows. Recently complaints have been lodged by the Federal Aviation Administration and the United States AeroSpace Command regarding interference with air traffic control radar and guidance systems both on the ground and airborne caused by large scale wind farms.

Additionally, significant losses in electrical energy are incurred due to long distance transmission from the wind farm sites to the utility substations which has resulted in low utilization of wind power and has reduced the effectiveness and reliability of the power generated. System shut down in gusty and turbulent wind conditions has resulted in "spiking" in the utility grid, creating inefficiency. The system loads can be unpredictable and unreliable. In many cases, wind energy is not used due to these problems and the utility industry is rethinking its investment and deployment strategy.

On a smaller scale, wind turbine systems have been developed for generating power at or near the point of use. However, such systems have typically had only modest power generation capabilities, thereby limiting their application to the useful generation of power. For example, such systems have been utilized for low power applications, such as charging batteries and direct current (DC) applications. As a result, deployment of such systems has typically been limited to remote locations, where electrical power may otherwise be unavailable, as opposed to being deployed as an alternate energy source where grid power is otherwise available. Therefore, the use of wind generated electrical power at or near the point of use, on a scale at which the sale of electricity to an electric utility during times when the wind generated power is not entirely consumed at the location, has been limited.

SUMMARY

The present invention is directed to solving these and other problems and disadvantages of the prior art. In accordance with embodiments of the present invention, a wind turbine system having first and second turbine assemblies is provided. The first and second turbine assemblies are configured to rotate about a first axis, in opposite directions, in the presence of a suitable wind. In addition, first and second shroud assemblies are associated with the first and second wind turbine assemblies respectively. The first and second shroud assemblies extend around the outer circumference of the corresponding first and second turbine assemblies. In addition, the shroud assemblies include shroud members that extend around some portion of the outer circumference of the respective turbine assembly.

In accordance with further embodiments of the present invention, the first turbine assembly is interconnected to a first drive shaft having an axis of rotation that is coincident with the first axis of the system. In addition, the second turbine assembly is interconnected to a second drive shaft that has an axis of rotation that also is coincident with the first axis of the system. Moreover, at least a portion of the second drive shaft can be received by and rotate within the first drive shaft. The first and second drive shafts are part of a drive train assembly that can operate to transfer wind energy from the turbine assemblies to a generator.

A wind turbine system in accordance with embodiments of the present invention can include a base member to which the turbine assemblies and the shroud assemblies are interconnected, either directly or through other components. For example, the first shroud assembly can be interconnected to the base member, and the second shroud assembly can in turn be interconnected to the first shroud assembly. Moreover, the first shroud assembly can be selectively positioned by rotating the first shroud assembly about the first axis of the system and relative to the base member. In accordance with further embodiments of the present invention, the second shroud assembly can be selectively positioned by rotating the second shroud assembly about the first axis of the system relative to the base member and the first shroud assembly. In accordance with still further embodiments of the present invention, the first and second shroud assemblies can comprise a support structure that at least partially supports one or both of the turbine assemblies. In addition, the first drive shaft of the first wind turbine assembly can be rotatably interconnected to the base member. The second drive shaft of the second wind turbine assembly can also be rotatably interconnected to the base member. In addition, bearings can rotatably interconnect the first and second drive shafts. In accordance with still other embodiments, one or both of the first and second drive shafts can be interconnected to a support structure comprising one or both of the shroud assemblies.

Methods in accordance with embodiments of the present invention include providing counter-rotating turbine assemblies. The turbine assemblies are selectively exposed to the wind through operation of shroud assemblies. More particularly, the shroud assemblies are rotated about a first axis of the system to expose a portion of a corresponding wind turbine assembly to the wind, while shielding another portion of that wind turbine assembly from the wind. The shroud assemblies can thus be used to control the exposure of the turbine assemblies to the wind so that the turbine assemblies are driven in a desired direction and to control the force of the wind on the turbine assemblies. In addition, the shroud assemblies can be positioned to entirely or substantially shield the turbine assemblies, for example where the generation of power is not desired, or to protect the wind turbine system from extremely strong winds.

Additional features and advantages of embodiments of the present invention will become more readily apparent from the following description, particularly when taken together with the accompanying drawings.

DETAILED DESCRIPTION

Figure 1:
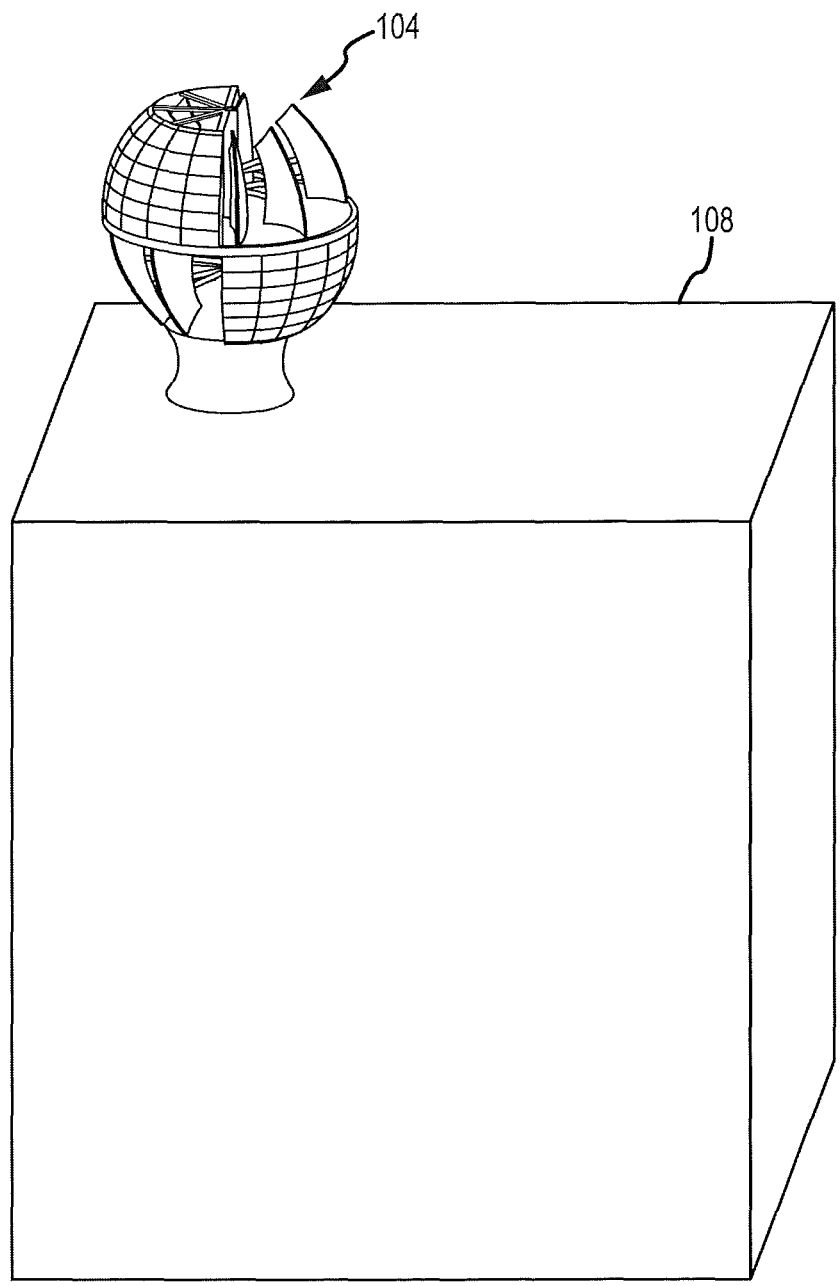
FIG. 1 depicts a wind turbine system in accordance with embodiments of the present invention in an exemplary operating environment.

FIG. 1 depicts a wind turbine system 104 in accordance with embodiments of the present invention, in an exemplary operating environment. In particular, the wind turbine system 104 is shown mounted to a platform 108. In this example, the platform 108 comprises a tall building, and the wind turbine system 104 is mounted to the roof of that building 108. However, a wind turbine system 104 in accordance with embodiments of the present invention can be associated with any type of platform 108. Therefore, examples of suitable platforms 108 to which a wind turbine system 104 as disclosed herein can be mounted include, in addition to tall buildings such as skyscrapers, mid-rise buildings, warehouses, big box retail stores, residences, towers, storage tanks, bridges or platforms. In addition, although depicted in an upright vertical orientation in the example of FIG. 1, a wind turbine system 104 can be mounted in alternate orientations. For example, a wind turbine system 104 can be mounted in a horizontal orientation, for instance to the side of a platform 108 comprising a building or tower. As another example, a wind turbine system 104 in accordance with embodiments of the present invention can be mounted in an upside down vertical orientation, for example to the underside of a bridge.

Figure 2:
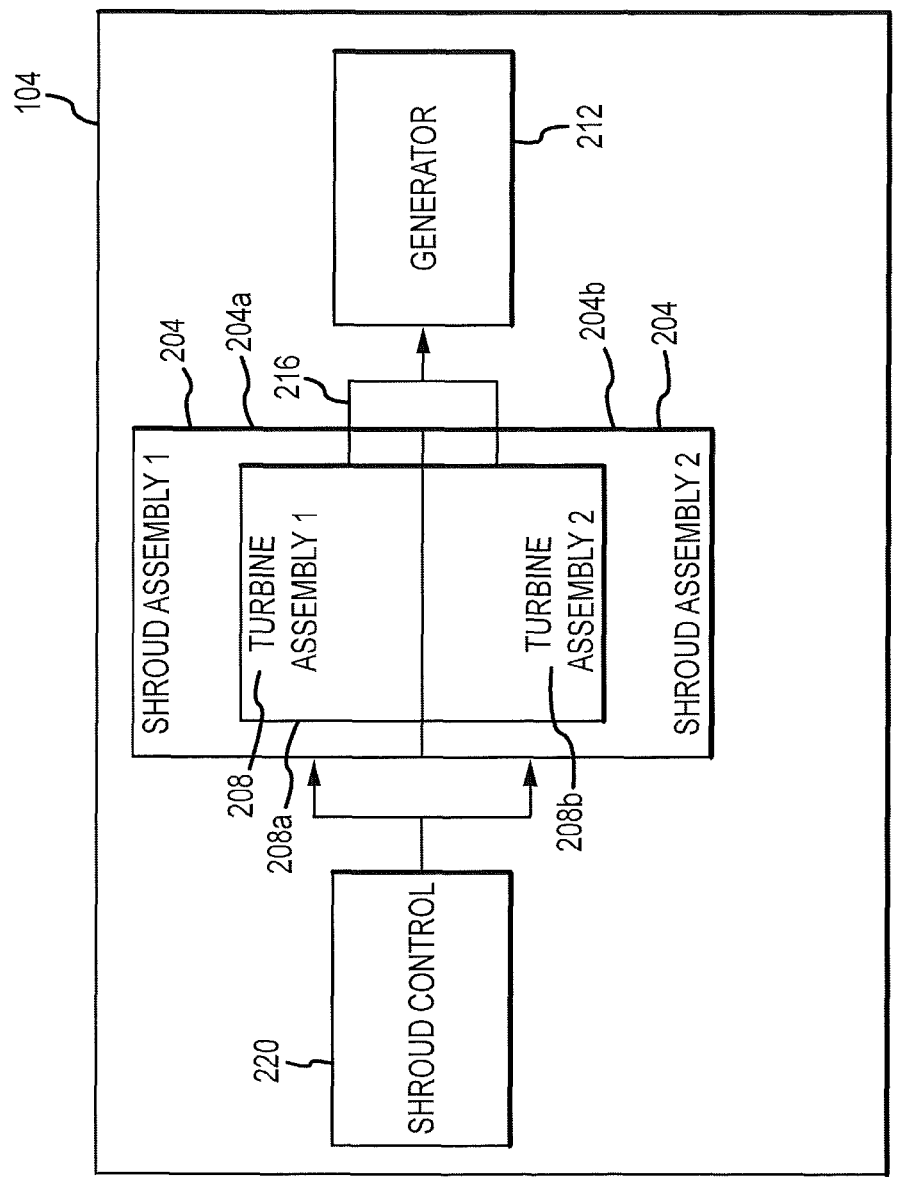
FIG. 2 is a block diagram depicting components of a wind turbine system in accordance with embodiments of the present invention.

FIG. 2 is a block diagram depicting components of a wind turbine system 104 in accordance with embodiments of the present invention. In general, the wind turbine system 104 can include a number of shroud assemblies 204. For instance, a wind turbine system 104 can include a first shroud assembly 204a and a second shroud assembly 204b. In general, each shroud assembly 204 is associated with and can at least partially define a volume containing a turbine assembly 208. Accordingly, a wind turbine system 104 can include a first turbine assembly 208a and a second turbine assembly 208b. The turbine assemblies 208 can be coupled to an electrical generator 212 by a drive train assembly 216. Although referred to herein as a generator 212, the component of the wind turbine system 104 used to generate electricity may comprise a motor operated as an electrical generator. As an example, and without limitation, the generator 212 may comprise a 60 Hz 3 phase permanent magnet generator. Moreover, the drive train assembly 216 can include drive shafts that interconnect the turbine assemblies 208 to an input shaft of the generator 212 via a clutch. In accordance with embodiments of the present invention, the generator 212 can comprise any electrical generator. The wind turbine system 104 can also include a shroud control system 220. The shroud control system 220 can comprise motors, sensors, and controllers or processors for determining and controlling the position of the shroud assemblies 204.

Figure 3:
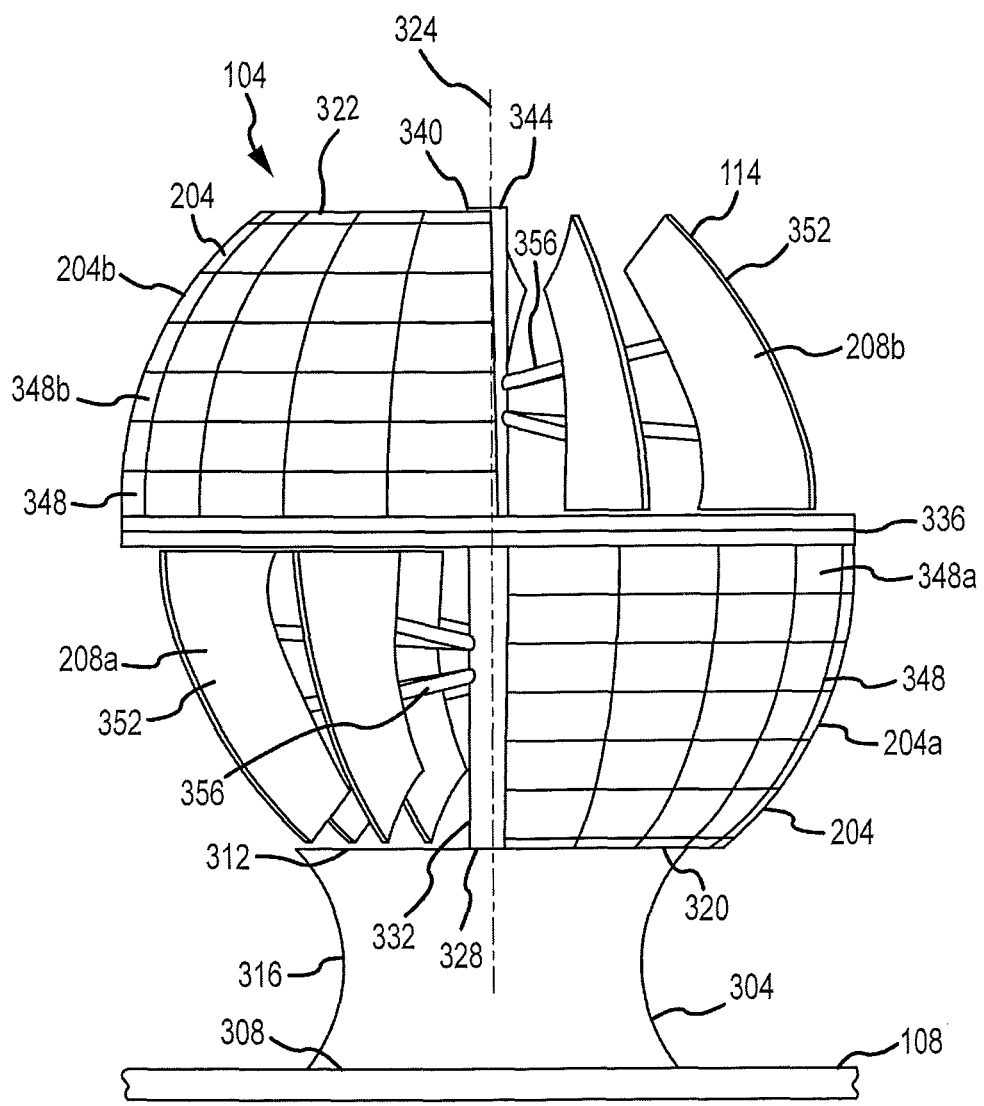
FIG. 3 is a front view in elevation of a wind turbine system in accordance with embodiments of the present invention.

FIG. 3 depicts a wind turbine system 104 in accordance with embodiments of the present invention in elevation. In this exemplary embodiment, the wind turbine system 104 is mounted to a base member 304 that is in turn mounted to the platform 108. In this embodiment, the base member 304 includes a bottom plate or first end surface 308 and a top plate or second end surface 312. Although the terms top and bottom are used throughout the specification for ease of description, it should be appreciated that the wind turbine system 104 can be oriented such that the bottom surface is above the top surface, or is at the same elevation or average elevation above the ground as the top surface, depending on the orientation of the wind turbine system 104. Accordingly, as used herein, a bottom surface, member or other element refers to an instance of the associated component or assembly that is more proximal to the platform 108 or the base member 304 than is a top component or assembly. The bottom plate or first end surface 308 can comprise a first circular end surface, while the top plate or second end surface 312 can comprise a second circular end surface. In this particular embodiment, the base member 304 includes an intermediate section 316 having a diameter that is less than the diameter of the first circular end surface 308 and the second circular end surface 316. Accordingly, the base member 304 can have a profile that is tapered in the center.

The first shroud assembly 204a is mounted to the base member 304 via a first circular track or peripheral bearing assembly 320. The first peripheral bearing assembly 320 allows the first shroud assembly 204a to be rotated relative to the base member 304 about a first or system axis 324. A first central bearing assembly 328 can also be provided to rotatably interconnect the first shroud assembly 204a to the base member 304 and/or a first drive shaft 332. The second shroud assembly 204b is interconnected to the first shroud assembly 204a via a second circular track or equatorial bearing assembly 336. The equatorial bearing assembly 336 allows the second shroud assembly 204b to be rotated about the system axis 324 relative to the base member 304, and relative to an independently of the first shroud assembly 204a. A second central bearing assembly 340 can also be provided to rotatably interconnect the second shroud assembly 204b to a second drive shaft 344. Sensors comprising position encoders can be associated with or incorporated into some or all of the bearing assemblies 320, 328, 336 and 340, to provide information to a controller of the shroud control system 220 regarding the positions of the shroud assemblies 304 about the system axis 324.

Each of the shroud assemblies 204 includes a shroud member 348. In particular, a first shroud member 348a associated with the first shroud assembly 204a generally extends between the first peripheral bearing assembly 320 and the hemispherical bearing assembly 336. In accordance with at least some embodiments, the first shroud member 348a is mounted to the first shroud assembly 204a via the first peripheral bearing assembly 320 and the equatorial bearings assembly 336, and thus can be rotated relative to the system or central axis 124 and the first shroud assembly 204a by moving the shroud member 348a along the bearing assemblies 320 and 336. In addition, the first shroud member 348a is generally hemispherical in that it extends for about one half the outer circumference of the first shroud assembly 204a. The second shroud assembly 348b generally extends between the hemispherical bearing 336 to or near a top extent of the wind turbine system 104. In accordance with at least some embodiments, the second shroud member 348b is mounted to the second shroud assembly 204b via a second peripheral bearing assembly 322 and the equatorial bearing assembly 336, and can be rotated relative to the central axis 124 and the second shroud assembly 204b by moving the shroud member 348b along the bearing assembly 322 and 336. The second shroud member 358b is generally hemispherical in that it extends around about one half the outer circumference of the second shroud assembly 204b. In addition, the shroud assemblies 204 together define a shape that is generally spherical.

The shroud assemblies 204 also generally describe a partially enclosed volume comprising a housing for the turbine assemblies 208. In particular, the first shroud assembly 204a partially encloses the first turbine assembly 208a. Similarly, the second shroud assembly 204b partially encloses the second turbine assembly 208b. The rotational locations about the system axis 324 that are enclosed by the shroud members 348 of the shroud assemblies 204 are controlled to provide a desired operational state of the wind turbine system 104, as described elsewhere herein. Moreover, positioning of the shroud assemblies 204 can be effected through the actuation of motors, such as stepper motors, associated with or incorporated into some or all of the bearings 320, 328, 336, and 340. In addition, embodiments of the present invention include turbine assemblies 208 that each comprise a plurality of airfoils or blades 352 having a first surface 804 and a second surface 808. Moreover, the blades 352 of the first turbine assembly 208a are oriented to rotate that assembly 208a in a first direction about the system axis 324, while the blades 352 of the second turbine assembly 208b are oriented to rotate that assembly 208b in a second direction about the system axis 324. In accordance with embodiments of the present invention, the first turbine assembly 208a may have a first number of blades 352, and the second turbine assembly 208b may have a second, different number of blades 352. Accordingly, the turbine assemblies 208 are asynchronous in operation. Each of the blades 352 of the first turbine assembly 208a can be interconnected to the first drive shaft 332 by a blade support structure 356. Similarly, each of the blades 352 of the second turbine assembly 208b can be interconnected to the second drive shaft 344 by a blade support structure 356. The blade support structure 356 can include one or more struts, although other configurations are possible.

Figure 4:
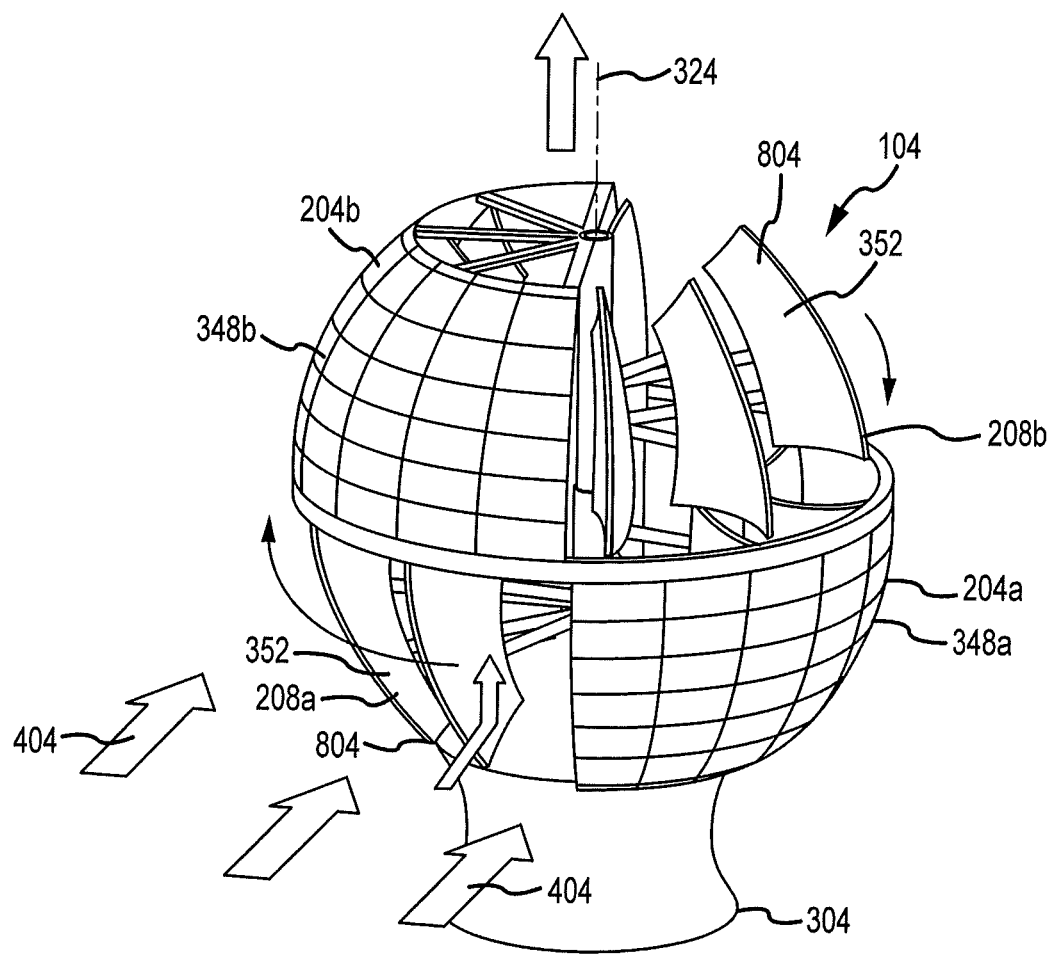
FIG. 4 is a perspective view of a wind turbine system in accordance with embodiments of the present invention.

FIG. 4 is a perspective view of a wind turbine system 104 in accordance with embodiments of the present invention. More particularly, FIG. 4 illustrates the relationship of a wind turbine system 104 to a prevailing wind 404 and flow paths through the wind turbine system 104 under exemplary operating conditions. In FIG. 4, the shroud assemblies 204 are shown positioned such that about a 90° section or arc of each of the turbine assemblies 208 is exposed to face the wind 404. Moreover, the shroud assemblies 204 are positioned so that the wind is incident on the first side or surface 804 of the blades 352 of the turbine assemblies 208, and to allow the wind 404 to apply a generally tangential force on the turbine assemblies 208 such that the turbine assemblies 208 rotate in opposite directions about the system axis 324. Thus, in this example, the resulting exposure of the turbine assemblies 208 to the incident wind 404 causes the first turbine assembly 208b to be rotated in a clockwise direction about the system axis 324, and causes the second turbine assembly 208b to be rotated in a counter-clockwise direction, when the wind turbine system 104 is viewed from above. In addition, the wind turbine system 104 provides a stepper or dual compressor effect with respect to at least some of the incident wind 404. In particular, the blades 352 of the first turbine assembly 208a generally direct at least some of the wind incident thereon upwards through the wind turbine system 104, to the second turbine assembly 204b. Therefore, in addition to the wind 404 that is directly incident on the blades 352 of the second turbine assembly 208b, at least some wind that was incident on the blades 352 of the first turbine assembly 204a is available to also act on the blades 352 of the second turbine assembly 208b.

As can be appreciated by one of skill in the art after consideration of the present disclosure, the counter-rotation of the first 208a and second 208b turbine assemblies results in a small or even zero torsional force on an associated platform 108. In addition, the counter-rotating turbine assemblies 208 can provide reduced vibration characteristics as compared to systems that do not employ counter rotating turbine assemblies or elements that are asynchronous due to having differing numbers of blades or airfoils. For example, the first turbine assembly 208a may have a larger number of blades than the second turbine assembly 208b. In addition, the flow paths of the wind 404 through the turbine assemblies 208 and the movement of the turbine assemblies 208 in a direction that is generally away from the incident wind 404 can provide a safer environment for birds and other wildlife.

Figure 5:
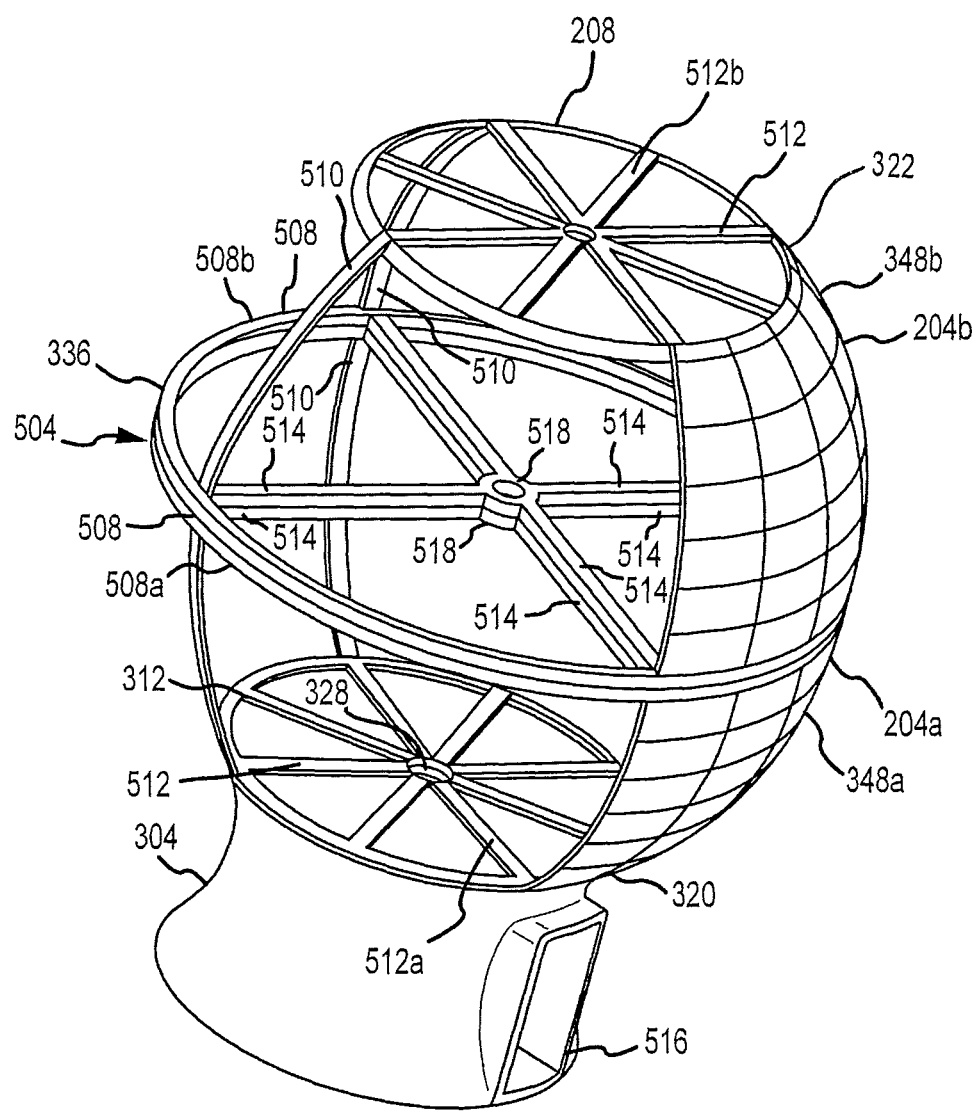
FIG. 5 is a perspective view of wind turbine system support structure components in accordance with embodiments of the present invention.

FIG. 5 is a perspective view of components of a support structure 504 of a wind turbine system in accordance with embodiments of the present invention. In addition, FIG. 5 illustrates the generally spherical volume or truncated spherical volume defined by the shroud assemblies 204. The support structure 504 can include the base member 304, the first shroud assembly 204a, and the second shroud assembly 204b. Additional details of embodiments of the shroud assemblies 204 are also illustrated. In particular, it can be seen that each shroud assembly 204 includes an equatorial support member 508. Moreover, the equatorial support member 508a of the first shroud assembly 204a is interconnected to the equatorial support member 508b of the second shroud assembly 204b by the equatorial bearing assembly 336. As discussed elsewhere herein, the equatorial bearing assembly 336 allows the rotational position of the second shroud assembly 204b to be changed relative to the first shroud assembly 204a and the base member 304. In accordance with further embodiments of the present invention, each shroud assembly 204 can include a number of longitudinal support members 510. For example, each shroud assembly 204 can include four longitudinal support members 510 spaced at 90° intervals. Moreover, each shroud assembly 204 can include radial members 514 that extend between the equatorial support member 508 and a center ring 518 of the associated shroud assembly 204. It can also be seen that, at least in some embodiments of the disclosed invention, the support for the second shroud assembly 204b can be entirely or primarily provided by the first shroud assembly 204a.

In addition to an equatorial support member 508 and longitudinal support members 510, each shroud assembly 204 can include a web structure 512. In general, the web structure 512 provides support for a corresponding shroud assembly 204, at an end of that shroud assembly 204 opposite the equatorial support member 508, and also provides support for longitudinal support members 510 that extend between the web structure 512 and the equatorial support member 508. The web structure 512a associated with the first shroud assembly 204a can also include or can be proximate to a portion of the peripheral bearing assembly 320 associated with the first shroud assembly 204a, and/or the central bearing assembly 328. The web structure 512b associated with the second shroud assembly 204b can function to provide additional support for the second shroud member 348b. In addition, the second web structure 512b can include or be associated with a portion of the bearing assembly 340. FIG. 5 also illustrates an access panel 516 in the base member 304. The access panel 516 can be used to access the generator 212 and/or other wind turbine system 104 components housed within the base member 304. In accordance with other embodiments of the present invention, the shroud members 348 can be rotated around the central axis 324 relative to the associated shroud assembly 204 support members and structures. For example, each shroud member 348 can be mounted to the remainder of the wind turbine system 104 by the equatorial bearing assembly 336 and by end bearings 518 interconnected to the web structure 512 of the associated shroud assembly 204.

Figure 6A:
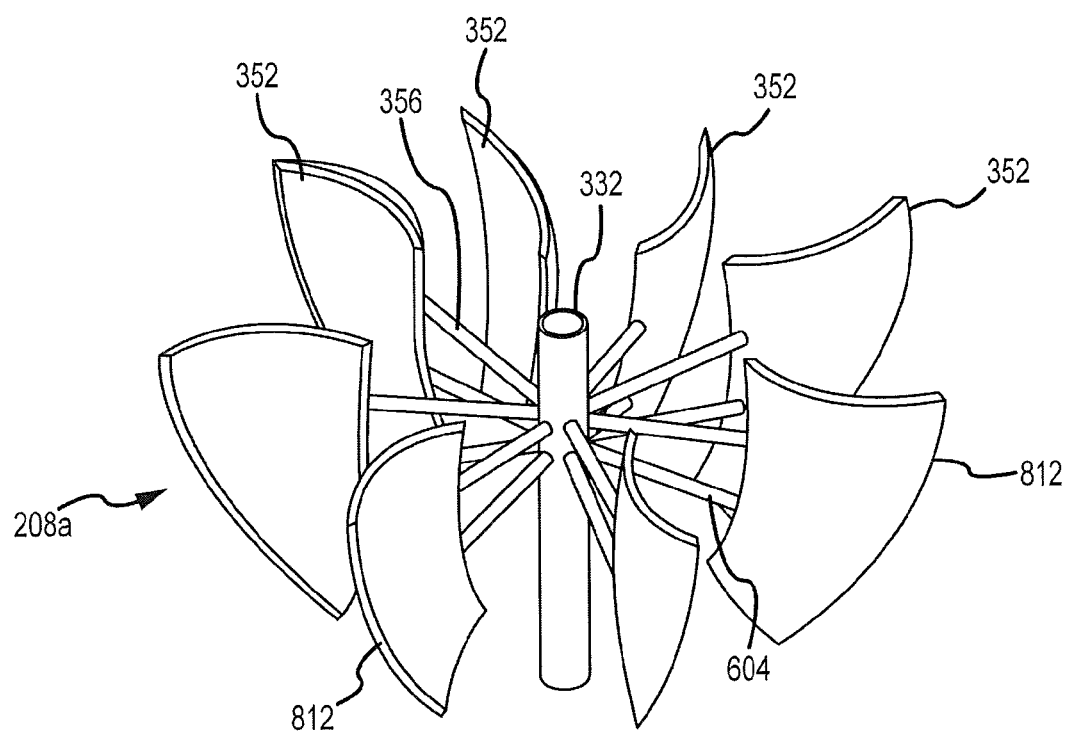
FIG. 6A is a top perspective view of a first turbine assembly in accordance with embodiments of the present invention.
Figure 6B:
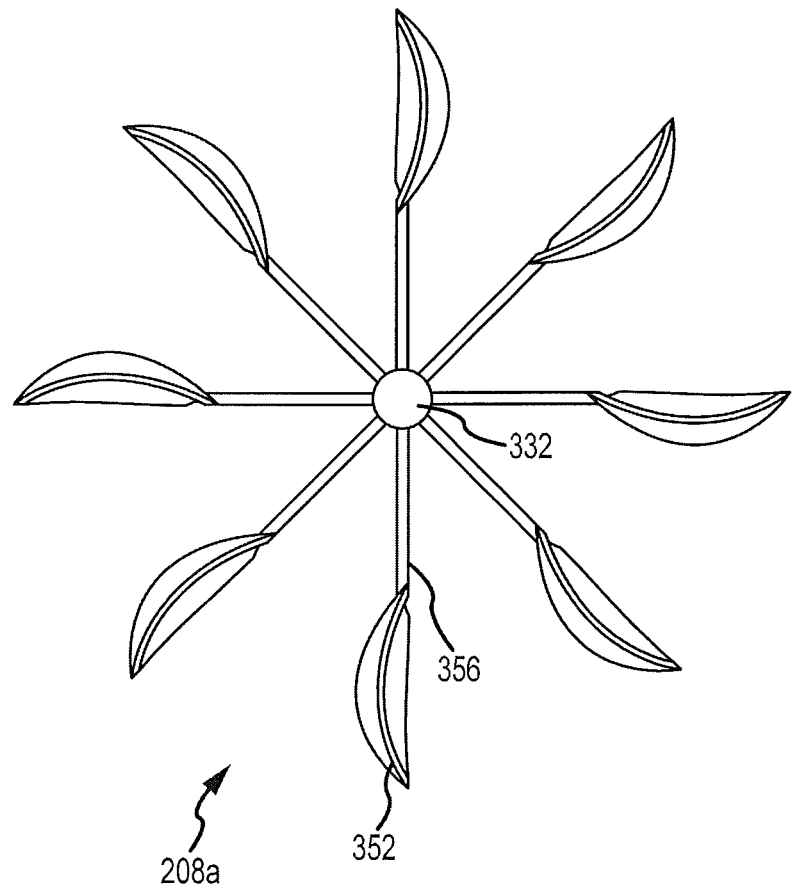
FIG. 6B is a top plan view of a first turbine assembly in accordance with embodiments of the present invention.
Figure 6C:
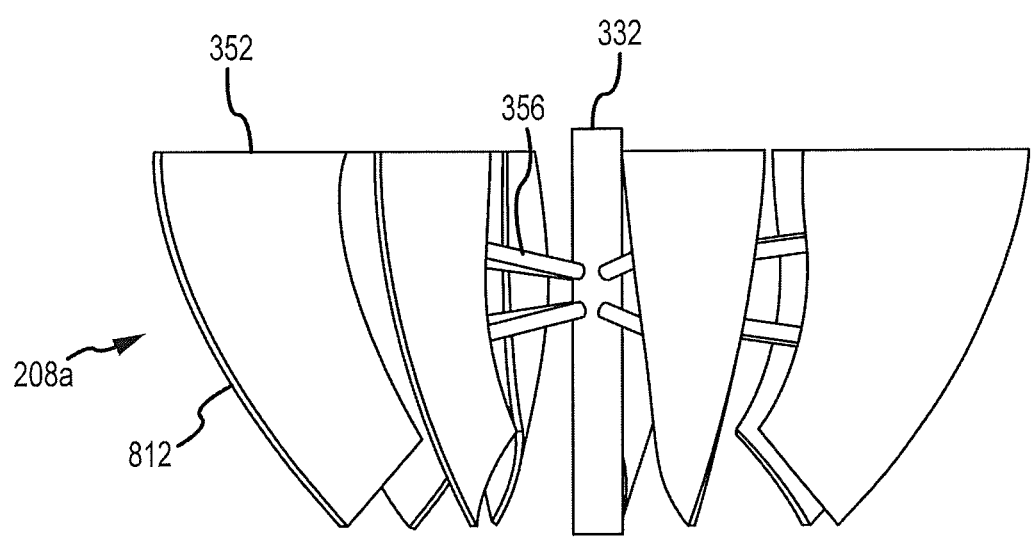
FIG. 6C is a view in elevation of a first turbine assembly in accordance with embodiments of the present invention.

FIGS. 6A-6C illustrate top perspective, top plan, and elevation views respectively of a first turbine assembly 208a in accordance with embodiments of the present invention. As previously noted, the first turbine assembly 208a includes a plurality of airfoils or blades 352. In this example, eight blades 352 are shown. However, this is not a requirement, and the number of blades 352 in a particular embodiment will depend on the design of the individual airfoils 352 and other considerations. For instance, it is desirable to maintain a spacing between blades 352 that is sufficient to allow the individual blades 352 to operate efficiently. In particular, a blade 352 can function as a lifting body through at least some portion of the rotation of the turbine assembly 208. For example, with an associated shroud assembly 204 positioned so that the turbine assembly 208 can extract a maximum amount of energy from the wind, a blade 352 will act as a lifting body as it comes from behind the shroud member 348 and enters the air flow or wind, and for some additional degrees of rotation of the turbine assembly 208. Therefore, it is desirable to maintain a spacing between blades 352 that is large enough to allow each blade 352 to generate lift without being negatively impacted by turbulence from adjacent blades 352. Moreover, the blades 352 can be spaced such that as the angle of attack of a blade 352 increases and the blade 352 begins to spill wind, that spilled wind is directed towards and impacts a downwind blade 352. In addition, once the blade 352 has advanced to a point that the blade 352 is more normal to the wind, it is beneficial to maintain spacing between the blades 352 that is large enough to allow the wind to impact the blade 352 unimpeded or relatively unimpeded by the next blade 352. As can be appreciated by one of skill in the art, in selecting the number of blades 352 to include in a turbine assembly 208, the benefits of maintaining space between blades 352 is generally balanced against the additional force that can be extracted from wind of a given velocity by having a larger number of blades 352 exposed to the wind at a particular moment in time.

Each blade 352 in the illustrated example is interconnected to the first drive shaft 332 by a support structure 356 comprising a plurality of support struts 604. From the views in FIGS. 6A-6C, it can be appreciated that the blades 352 are shaped to be effective to rotate the first drive shaft 335 when a portion of the wind turbine assembly 208 is exposed to an incident wind with a component that is generally tangential to an outer circumference of the turbine assembly 208a. In particular, the blades 352 of the first wind turbine assembly 208a are configured to rotate the first drive shaft 335 in a clockwise direction, when the first wind turbine assembly 204a is viewed from above, and when exposed to such an incident wind. In addition, the blades 352 can be configured to direct at least some wind incident on the blades 352 in an end to end (e.g., a bottom to top) direction. Moreover, the outer edges 812 can be contoured so that the overall profile of the blade portion of the first turbine assembly 208a is hemispherical or hemispherical-like.

Figure 7A:
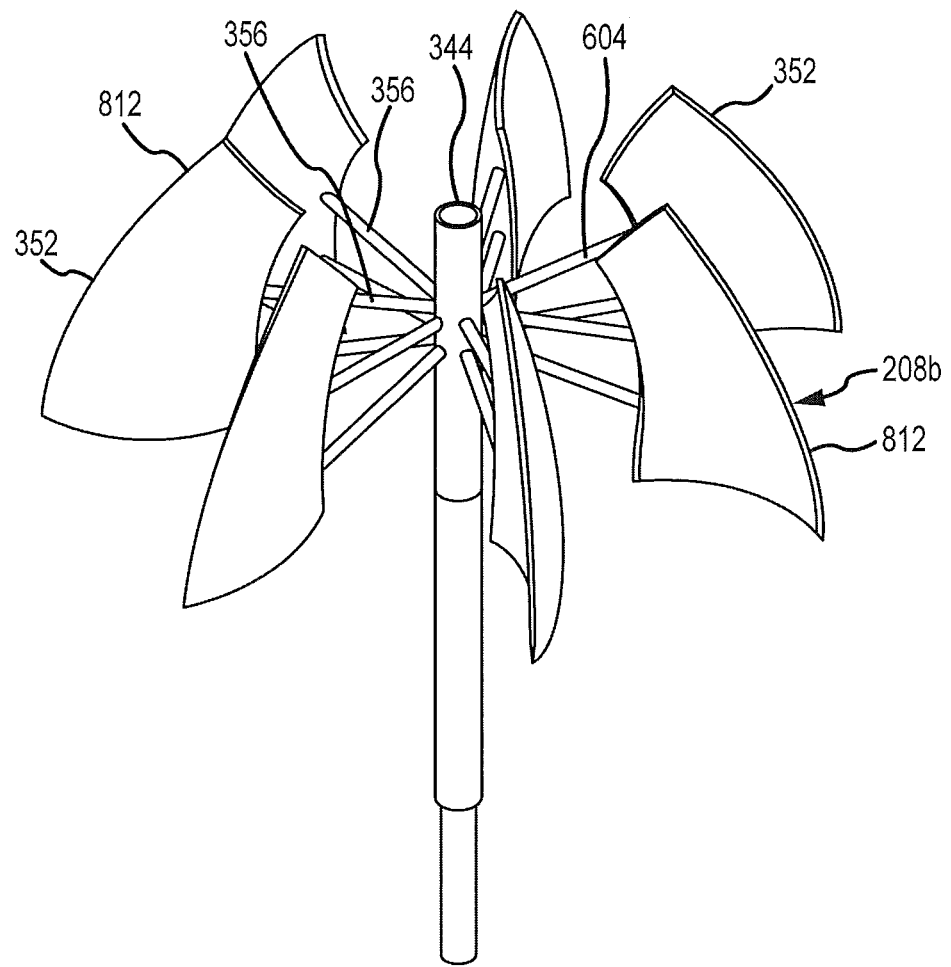
FIG. 7A is a top perspective view of a second turbine assembly in accordance with embodiments of the present invention.
Figure 7B:
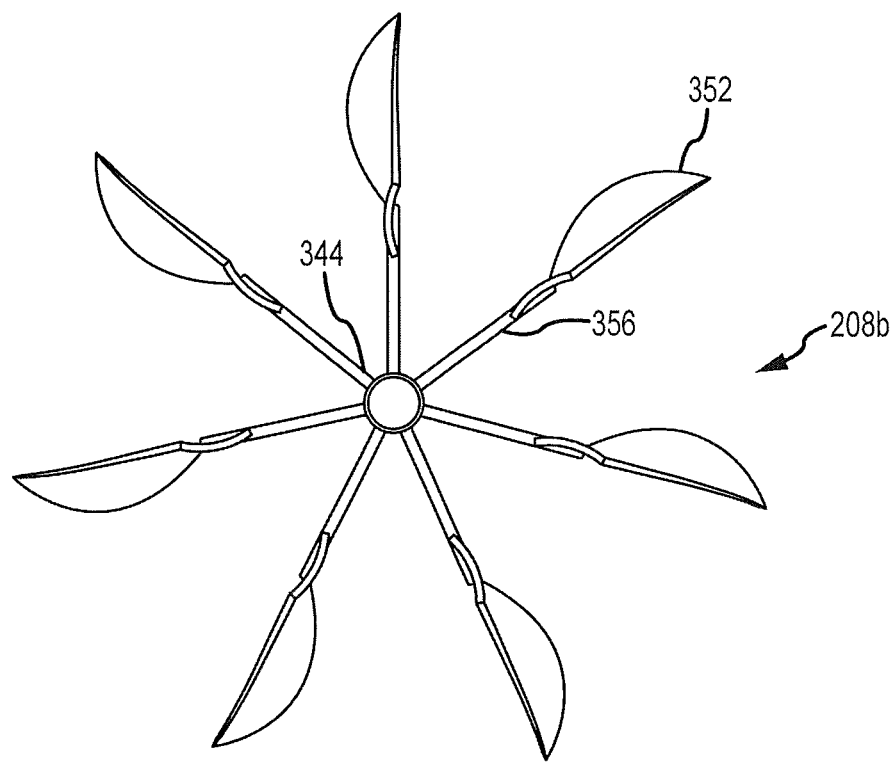
FIG. 7B is a top plan view of a second turbine assembly in accordance with embodiments of the present invention.
Figure 7C:
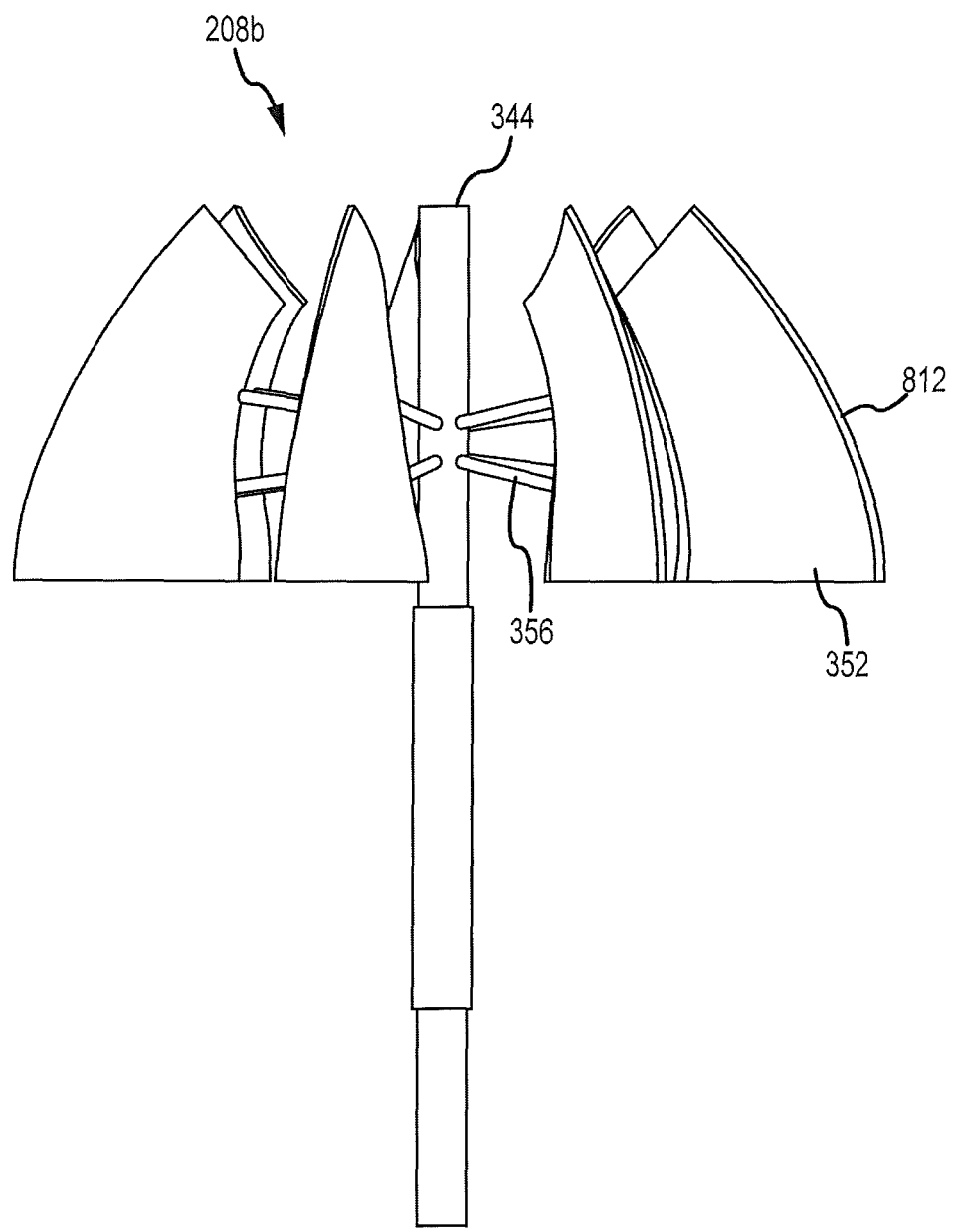
FIG. 7C is a view in elevation of a second turbine assembly in accordance with embodiments of the present invention.

FIGS. 7A-7C illustrate a second turbine assembly 208b in accordance with embodiments of the present invention in top perspective, top plan and elevation views respectively. Similar to the first turbine assembly 208a, the second turbine assembly 208b includes a plurality of airfoils or blades 352. The blades 352 of the second turbine assembly 208b are interconnected to the second drive shaft 344 by a support structure 356. In the illustrated example, the support structure 356 includes a plurality of support struts 604 associated with each blade 352. In this embodiment, the blades 352 are configured to rotate the second drive shaft 344 in a counterclockwise direction when the second turbine assembly 208b is viewed from above, in the presence of an incident wind having a component that is generally tangential to an outer circumference of the turbine assembly 208a. In addition, it can be appreciated that the blades 352 are configured to impart a rotational force to the second drive shaft 344 in a counterclockwise direction in response to an updraft of wind (or a bottom to top flow generally parallel to the system axis 324), such as may be provided by a first turbine assembly 208a in a wind turbine system 104 configured as illustrated in, for example, FIGS. 3 and 4. It can also be appreciated that at least a portion of the wind incident on the second turbine assembly 208b, either tangentially or as an updraft, can be exhausted in an upward direction (or in a direction generally parallel to the system axis 324). The outer edges 812 of the blades 352 can be contoured so that the overall profile of the blade portion of the second turbine assembly 208b is hemispherical or hemispherical-like.

In the example first turbine assembly 208a of FIGS. 6A-6C, seven blades 352 are shown, while in the example second turbine assembly 208b of FIGS. 7A-7C, six blades 352 are shown. The number of blades 352 in the turbine assemblies 208 of a particular embodiment of a wind turbine system 104 in accordance with the present invention will vary depending on the particular application and design considerations for example as described above in connection with the first turbine assembly 208a. In accordance with at least some embodiments of the present invention, the first 208a and second 208b turbine assemblies each have a different number of blades 352. In accordance with still further embodiments, the first turbine assembly 208a has a larger number of blades 352 than the second turbine assembly 208b. By so configuring the wind turbine system 104, vibration and noise produced during operation of the wind turbine system 104 can be reduced as compared to embodiments in which the first 208a and second 208b turbine assemblies have the same number of blades 352.

Figure 8A:
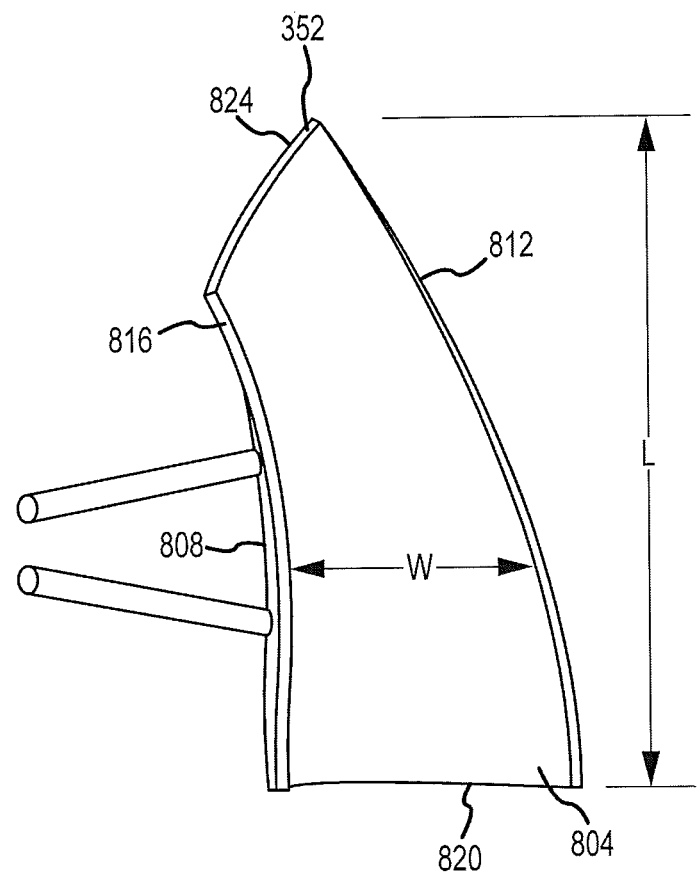
FIG. 8A is a front perspective view of a turbine assembly blade in accordance with embodiments of the present invention.
Figure 8B:
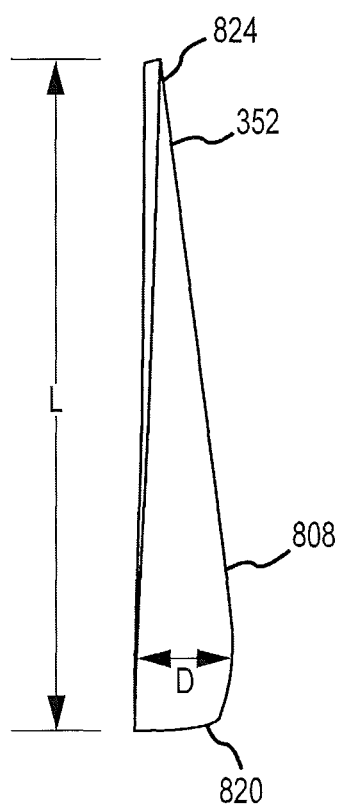
FIG. 8B is a side elevation of a turbine assembly blade in accordance with embodiments of the present invention.
Figure 8C:
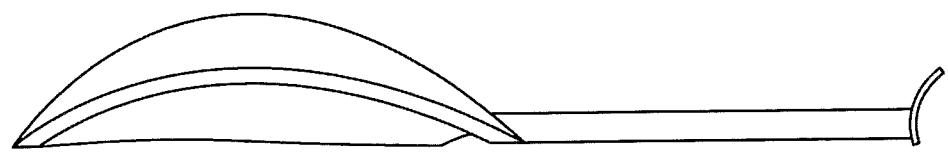
FIG. 8C is a first end view of a turbine assembly blade in accordance with embodiments of the present invention.
Figure 8D:
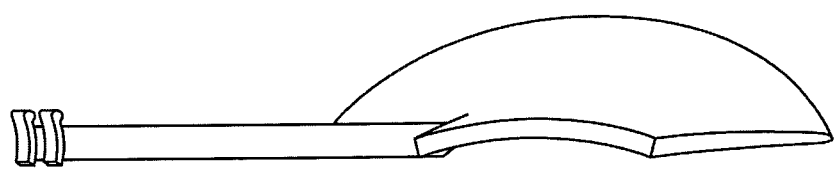
FIG. 8D is a second end view of a turbine assembly blade in accordance with embodiments of the present invention.

FIGS. 8A-8D provide different views of a blade 352 of a turbine assembly 204 in accordance with embodiments of the present invention. In particular, FIG. 8A is a perspective view, FIG. 8B is a side elevation, FIG. 8C is a first plan view, and FIG. 8D is a second plan view of an exemplary blade 352 in accordance with embodiments of the present invention. The blade 352 includes a first surface 804 that is cupped or profiled to capture wind incident on that surface 804. In addition or as an alternative to trapping wind like a bucket, the blades 352 can comprise lifting bodies. Therefore, a wind turbine system 104 can comprise both impulse turbine and reaction turbine operating principles. In operation, a wind system 104 in accordance with embodiments of the present invention generally positions the shroud members 348 such that the wind is allowed to be incident on the first surface 804 of the turbine assembly 208 blades 352. In addition, each blade 352 has a second surface 808 that is relatively streamlined such that, to the extent the blade 352 travels in a direction away from the first side 804 and towards the second side 808 of the blade 352, any air in front of the blade 352 during such movement is easily displaced. Accordingly, the blades 352 may be profiled such that the turbine assembly 208 including such blades 352 is rotated in one particular direction in the presence of a wind with a component that is tangential to the outer circumference of the turbine assembly 208.

In addition, the shape and/or contour of a blade 352 can be compound complex geometry and/or asymmetric geometry. For instance, the width W of the blade 352 can be different at different points along the length L of the blade 352. In addition, an outer side edge or leading edge 812 of the blade 352 can be curved, to define the generally hemispherical shape of a turbine assembly 208 including the blade 352. The blade 352 also includes an inner side edge or trailing edge 816 that, together with the outer side edge 812, defines the width of the blade 352. For example, and as shown in FIG. 8A, the side edges 812 and 816 can define a blade 352 with a width W that generally decreases from a base edge or end 820 of the blade 352 to the tapered or narrowed edge or end 824 of the blade 352. Moreover, the first surface 804 may curve from the base edge 820 to the tapered edge 824. For example, the curve may be generally inwardly from the base edge 820 to the tapered edge 824.

In addition to various curves and changes in dimension along the length L of the blade 352 when considered in a front view (see generally FIG. 8A), the blade 352 can also vary in the depth D of the cup or concave surface (or alternatively the height of the concave back surface 808). This depth D may vary with position along the length L of the blade 352. For example, moving from the base edge 820, the depth D can increase as the distance from the base edge 820 along the length L increases. After reaching a maximum point proximate the base edge 820, the depth D may gradually decrease as the distance from the base edge 820 along the length L decreases, until a minimum depth D proximate the tapered edge 824 is reached.

After consideration of FIGS. 8A-8D, it can be appreciated that the blade 352 may be contoured so as to provide a lifting body or airfoil. Therefore, wind flowing across the blade 352 will produce lift, at least within some range of angles of attack. Accordingly, the blades 352 may comprise airfoils or lifting bodies. Moreover, lift generated by the blades 352 of a turbine assembly 208 will result in a force in a direction that tends to rotate the associated turbine assembly 208. In addition, wind incident on the first surface 804 of a blade 352 is generally captured by the blade 352, to promote a transfer of energy from that wind to, for example, a turbine assembly 208 that includes the blade 352. Moreover, the blade 352 generally moves in a direction away from the wind. As a result, turbine assemblies 208 incorporating the blades 352 can comprise a combination of impulse turbine and reaction turbine operating characteristics.

Figure 9A:
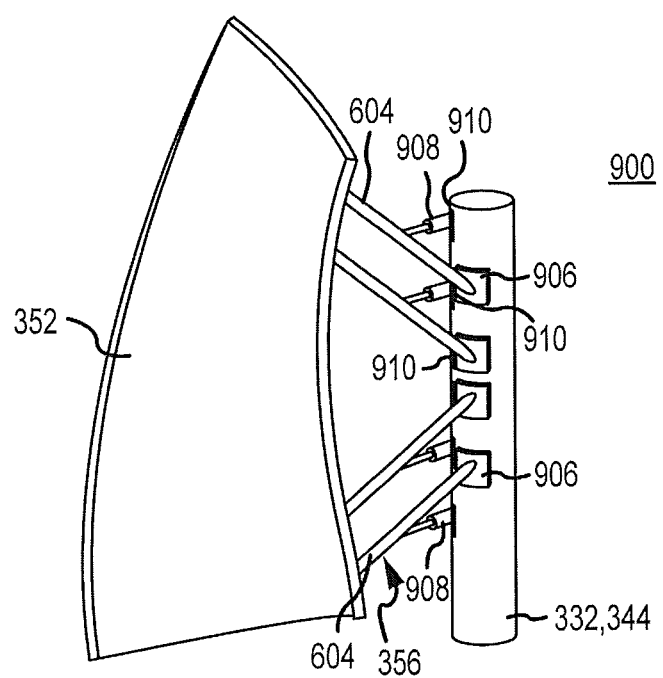
FIG. 9A depicts a portion of a turbine assembly in accordance with embodiments of the present invention.

FIG. 9A is an illustration of a portion of a turbine assembly 208 in accordance with embodiments of the present invention. In particular, portions of a drive shaft 332 or 344 and of a blade support structure 356 are illustrated. The blade support structure 356 is shown as including a plurality of struts 604. Each of the struts 604 can be interconnected to the drive shaft 332 or 344 via a hinge plate 906 and a compliance unit or structure 908. Each hinge plate 906 is interconnected to the associated drive shaft 332 or 344 via a hinge 910. The compliance unit 908, together with the hinge plate 906, provide a mechanism by which an airfoil 352 can move relative to the interconnected drive shaft 332 or 344 when the force of the wind on the blade 352 is especially strong. Accordingly, high forces, for example from gusting winds or sudden increases in wind velocity, can be absorbed by the wind turbine system 104 in a controlled manner.

Figure 9B:
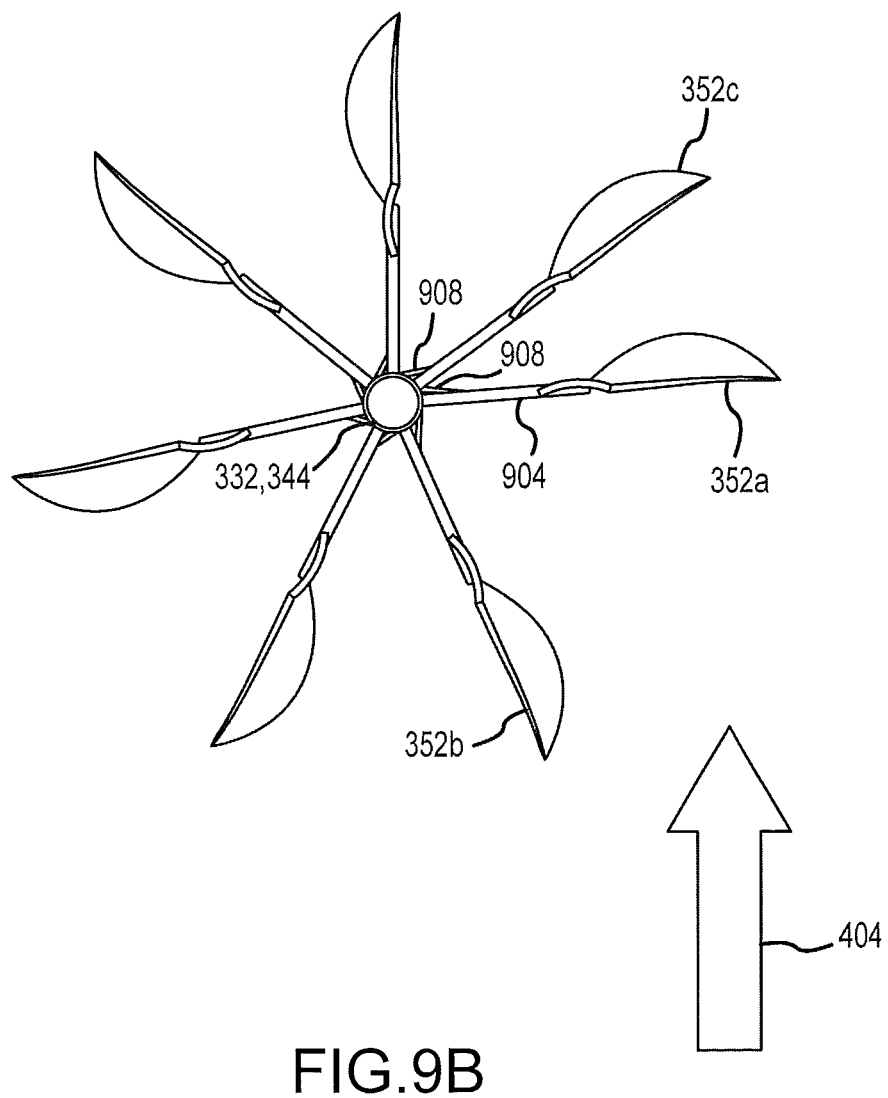
FIG. 9B is a plan view of a turbine assembly with a blade that has been displaced in accordance with embodiments of the present invention.

FIG. 9B illustrates a turbine assembly 208 in plan view, with a blade 352a that has been temporarily displaced by a gust of incident wind 404. In particular, the radial spacing of the displaced blade 352a with respect to the preceding blade 352b has been increased, while the radial spacing between the displaced blade 352a and a following blade 352c has decreased. This change in radial spacing is a result of the struts 604 of the support structure 356 associated with the first blade 352a transmitting a force to the compliance unit 908 that is greater than some threshold amount. Such a situation may occur, for example, where the incident wind 404 momentarily gusts. Accordingly, excess wind or a sudden increase in force imparted to a blade 352 can be absorbed. In particular, the blade 352 is allowed to open, dumping wind while absorbing force by moving against the compliance unit 908. With reference again to FIG. 9A, it can be appreciated that, as the radial position of the blade 352 with respect to the drive shaft 332 or 344 changes, the compliance unit 908 is compressed, and the hinge plate 906 pivots about the hinge 910 with respect to each strut 604 included in the support structure 356.

Figure 10:
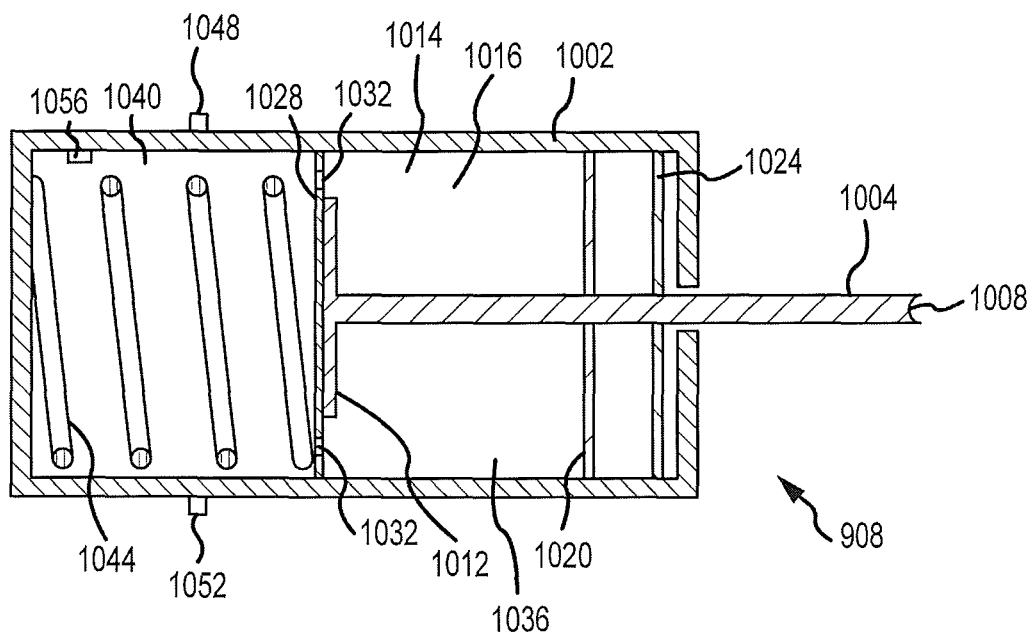
FIG. 10 is a cross-section of a compliance unit in accordance with embodiments of the present invention.

In accordance with further embodiments of the present invention, the compliance unit 908 can function as both a spring and a damper. More particularly, as depicted in FIG. 10, the compliance unit 908 can include a housing 1002 and a shaft member 1004 with a first end 1008 that, in an assembled state, is interconnected to a strut 604. The second end of the shaft 1004 comprises a plunger or piston 1012. The piston 1012 travels within a fluid 1014 that fills the interior chamber 1016 of the compliance unit. The interior chamber 1016 can be separated from the ambient environment by first 1020 and second 1024 seals. An equalization plate 1028 having a plurality of holes 1032 formed therein divides the fluid filled chamber 1016 into first 1036 and second 1040 sub chambers, with the holes 1032 allowing for communication of the fluid 1014 between the first 1036 and second 1040 sub chambers. The equalization plate 1028 can travel along at least some of the length of the fluid filled chamber 1016. In addition, a resilient member 1044, such as a spring or the like, can be provided within the second sub chamber 1040. The resilient member 1044 biases the shaft 1004 towards a fully extended position. An inlet 1048, and a relief fitting 1052 can be provided on the housing 1002 to allow for communication with the fluid filled chamber 1016. Moreover, various sensors 1056 can be provided, for example to monitor internal forces, operating temperatures, the position of the piston 1012 within the chamber 1016, and/or other operating parameters.

In operation, a force applied at the first end 1008 of the shaft 1004, for example from a gust of wind acting on a blade 352 supported at least in part by a strut 604 interconnected to the shaft 1004, will tend to push the piston 1012 against the resilient member 1044. When the force applied through the shaft 1004 to the resilient member 1044 is great enough, the shaft will compress the resilient member 1044, allowing the radial position of the associated blade 352 to change with respect to the associated shaft 332 or 344. In addition, the piston 1032 and the equalization plate 1028 dampen movement of the shaft 1004 with respect to the housing 1002. Accordingly, the rate at which the radial position of the blade 352 associated with the compliance unit 908 can change is restricted. As the blade 352 continues its rotation away from the incident wind 404 (see FIG. 9B), the force on the blade 352 will lessen. Once the force transmitted by the blade 352 to the shaft 1004 is less than the countering force of the resilient member 1044, the strut 1004 will be pushed back against the strut 604, and the blade 352 will return to its normal radial position with respect to the associated drive shaft 332 or 344. As can be appreciated by one of skill in the art after consideration of the present disclosure, the rate at which the shaft 1004 moves relative to the housing 1002 is limited by the damping effect provided by the flow of the fluid 1014 in the chamber 1016 through the holes 1032 in the equalization plate 1028. As can be appreciated by one of skill in the art after consideration of the present disclosure, different configurations of compliance units 908 can be used to absorb sudden increases in the force imparted to a blade 352 by the incident wind. For example, separate, instead of integrated, spring and damper units can be utilized. As a further example, a compliance unit 908 can be arranged such that an associated spring operates in tension rather than compression. In accordance with still other embodiments, compliance can be provided by the support structure 356, for example through the provision of flexible struts 604.

Figure 11A:
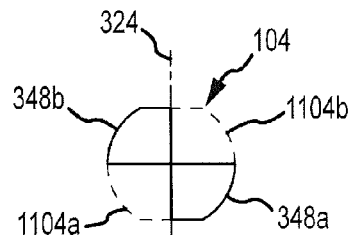
FIG. 11A depicts a wind turbine system in accordance with embodiments of the present invention, and illustrates shroud member positions in an exemplary operating environment.
Figure 11B:
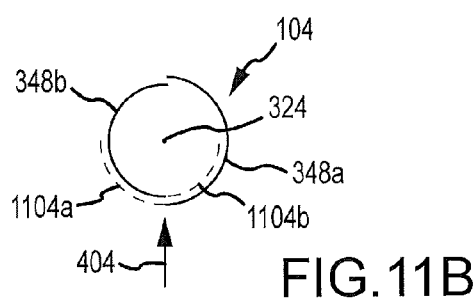
FIG. 11B depicts the shroud member positions of FIG. 11A in plan view.

FIGS. 11A-11B illustrate shroud member 348 positions relative to the wind 404, while the wind turbine system 104 is in a power generation mode, and while the wind 404 is incident on the wind turbine system 104 from a first direction. More particularly FIG. 11A is a view in elevation of a wind turbine system 104 in a power generation mode, with the wind traveling in a direction that is directly into the page. The configuration of the shrouds 348 illustrated in FIG. 11A is depicted in a top plan view in FIG. 11B. In this configuration, the wind turbine system 104 can draw a maximum amount of available energy from the incident wind 404. In particular, one quadrant or about 90° of a first area 1104a in a first hemisphere of the wind turbine system 104 is uncovered, thus exposing the first turbine assembly 208a (see, e.g., FIG. 2) to the wind 404. Similarly, a second area 1104b in a second hemisphere of the wind turbine system 104 is unshielded by the second shroud 348b, exposing a portion of the second turbine assembly 208b (see, e.g., FIG. 2) to the incident wind 404. As can be appreciated by one of skill in the art after consideration of the disclosure provided herein, by thus exposing the turbine assemblies 208 to the incident wind 404, at least a first component of that incident wind 404 is tangential to the first turbine assembly 208a, and at least a second component of the incident wind 404 is tangential to the second turbine assembly 208b. Moreover, by exposing the turbine assemblies 208 to the wind at opposed quadrants of the wind turbine system 104, the turbine assemblies 208 will tend to rotate in opposite directions. Moreover, the configuration exposes a first side 804 of the turbine assembly blades 352 to the incident wind 404, while shielding the second side 808 of the blades 352, promoting the efficient rotation of the turbine assemblies 208.

Figure 12A:
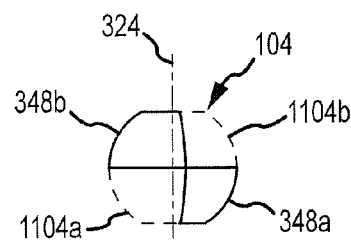
FIG. 12A depicts a wind turbine system in accordance with embodiments of the present invention, and illustrates shroud member positions in another operating environment.
Figure 12B:
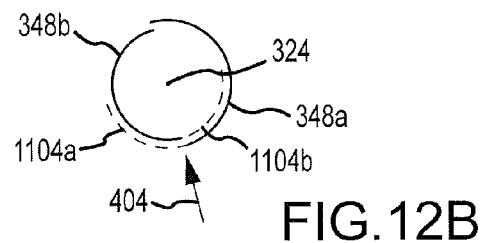
FIG. 12B depicts the shroud member positions of FIG. 12A in plan view.

In FIGS. 12A and 12B, a wind turbine system 104 in a maximum power generation mode is again illustrated in elevation (FIG. 12A) and top plan (FIG. 12B) views. However, in these views, the direction of the incident wind 404 has shifted by about 15° as compared to the conditions depicted in FIGS. 11A and 11B. In response to this shift in the direction of the wind 404, the rotational position of the shroud members 348 has changed. In particular, the shrouds 348 have been rotated about the system axis 324, to maintain an exposure to the turbine assemblies 208 that maximizes the energy transferred from the incident wind 404 to the wind turbine system 104. Therefore, while the same or about the same area 1104a and 1104b is exposed to the incident wind 404 (i.e., the areas 1104a and 1104b are the same as the example in FIGS. 11A and 11B when considered from a view taken along the wind direction), the absolute orientation of the shroud members 348 relative to the central axis 324 is shifted to track the change in wind 404 direction.

Figure 13A:
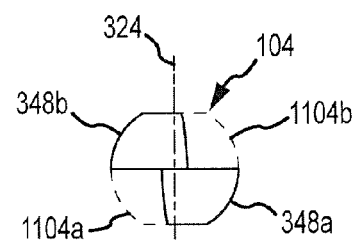
FIG. 13A depicts a wind turbine system in accordance with embodiments of the present invention, and illustrates shroud member positions in another operating environment.
Figure 13B:
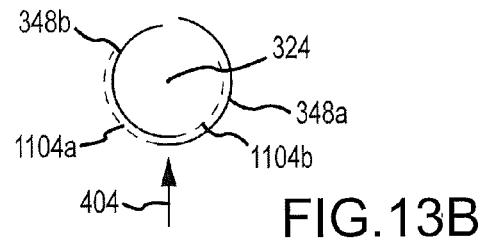
FIG. 13B depicts the shroud member positions of FIG. 13A in plan view.

FIGS. 13A and 13B depict an exemplary shroud member 348 configuration while the wind turbine system 104 is in a power generation mode, in the presence of a relatively strong incident wind 404. With respect to FIG. 13A, the wind is traveling in a direction that is directly into the page. In this configuration, the areas 1104a and 1104b of exposure of the turbine assemblies 204 has been reduced. That is, more of the area of the wind turbine assemblies 204 is shielded by the shroud members 348. Accordingly, the amount of wind 404 incident on the turbine assemblies 204 is reduced, thereby reducing the amount of energy transferred from the wind 404 by the wind turbine system 104 as compared to a configuration in which the exposed areas 1104a and 1104b are larger. The exposed area 1104a and 1104b can be further decreased if the velocity of the incident wind 404 increases. Similarly, in response to a decrease in the incident wind speed 404, the exposed areas 1104a and 1104b can be increased, until the velocity of the incident wind 404 has decreased to below some threshold amount, at which point the maximum power configuration depicted in FIGS. 11A, 11B, 12A and 12B is reached. Accordingly, the wind turbine system 104 can be selectively powered and depowered.

Figure 14A:
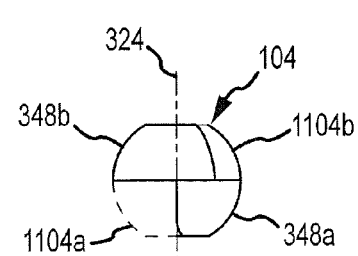
FIG. 14A depicts a wind turbine system in accordance with embodiments of the present invention, and illustrates shroud member positions in another operating environment.
Figure 14B:
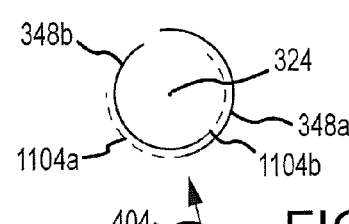
FIG. 14B depicts the shroud member positions of FIG. 14A in plan view.

While operating in the power generation mode in the presence of strong incident wind, in addition to reducing the exposed areas 1104a and 1104b, the rotational positions of the shroud members 348 can be altered to track changes in the direction of the incident wind 404. An example of a change in the position of the shroud members 348 due to a change in direction of a strong incident wind 404, as compared to the direction of the strong incident wind depicted in FIGS. 13A and 13B, is depicted in FIGS. 14A and 14B. In particular, while the areas 1104a and 1104b of exposed turbine assembly 208 remains depowered, the orientation of those areas has been shifted to track the change in the direction of the wind 404.

Figure 15A:
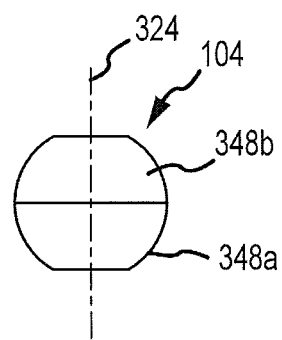
FIG. 15A depicts a wind turbine system in accordance with embodiments of the present invention, and illustrates shroud member positions in another operating environment.
Figure 15B:
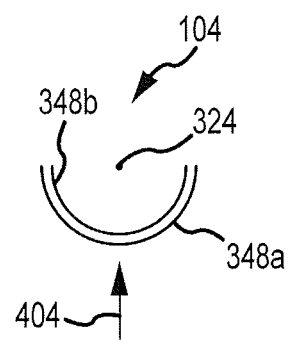
FIG. 15B depicts the shroud member positions of FIG. 15A in plan view.

FIGS. 15A and 15B illustrate shroud member 348 positions relative to the wind 404 while the wind turbine system 104 is in an idle mode. More particularly, FIG. 15A is a view in elevation of a wind turbine system 104 in an idle mode, with the wind traveling in a direction that is directly into the page. The configuration of the shrouds 348 illustrated in FIG. 15A is depicted in top plan view in FIG. 15B. In this configuration, the turbine assemblies 208 are completely or substantially shielded from the incident wind 404. This idle mode is generally entered when power generation is not desired or when the incident wind 404 velocity is too high for safe and reliable operation of the wind turbine system 104.

Figure 16A:
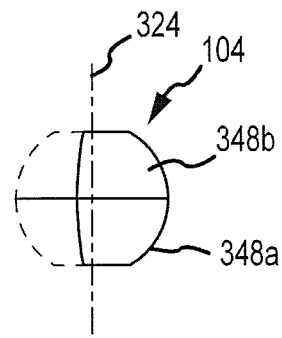
FIG. 16A depicts a wind turbine system in accordance with embodiments of the present invention, and illustrates shroud member positions in another operating environment.
Figure 16B:
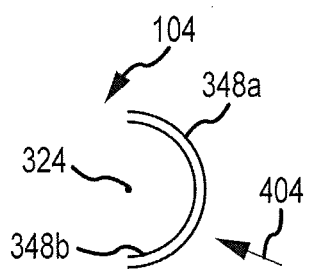
FIG. 16B depicts the shroud member positions of FIG. 16A in plan view.

FIGS. 16A and 16B illustrate the shroud member 348 positions in the idle mode, but in the presence of a wind shift of about 75° as compared to the wind direction and the configuration illustrated in FIGS. 15A and 15B. In particular, in order to track the shift in wind 404 direction, the shroud assemblies 204 are positioned to place the respective shroud members 308 such that the turbine assemblies 208 remain shielded from the wind 404. Therefore, it can be appreciated that, even in an idle mode, the position of the shroud members 348 about the system axis 324 can continue to be varied with changes in wind 404 direction.

Figure 17:
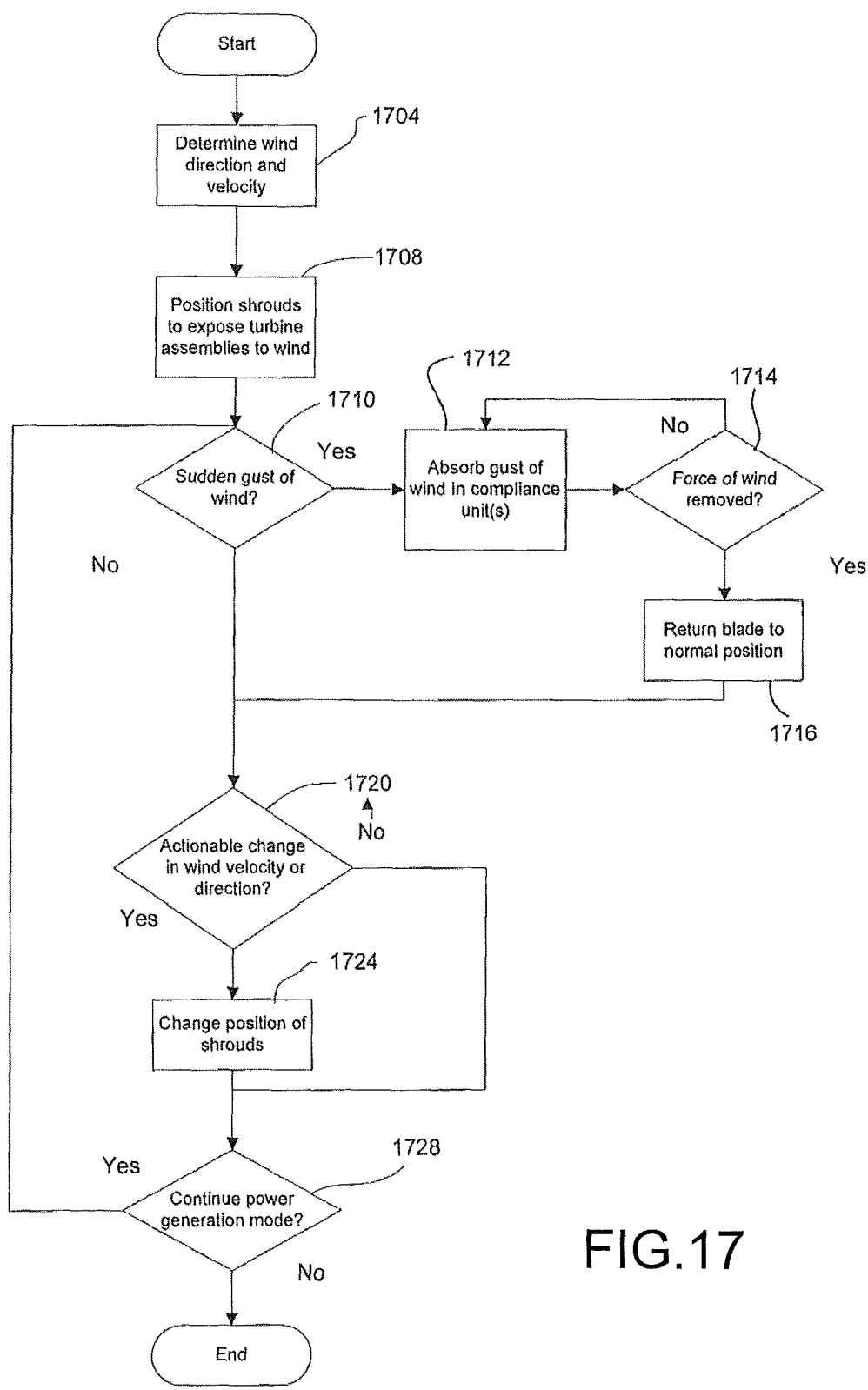
FIG. 17 is a flowchart depicting aspects of the operation of a wind turbine system 104 in accordance with embodiments of the present invention, and in particular operation while the wind turbine system 104 is in a power generation mode.

FIG. 17 is a flowchart depicting aspects of the operation of a wind turbine system 104 in accordance with embodiments of the present invention, and in particular operation while the wind turbine system 104 is in a power generation mode. Initially, after entering the power generation mode, the wind direction and velocity is determined (step 1704). The shroud members 348 are then positioned to expose the turbine assemblies 208 to the wind (step 1708). More particularly, a first shroud assembly 204a shroud member 348a can be positioned to uncover a first quadrant or other portion of a first turbine assembly 208, such that the wind is incident on the first surface 804 of the blades 352 within that quadrant. Similarly, a second shroud member 204b can be positioned by rotating the second shroud member 348b such that the wind is incident on a first surface 804 of some of the blades 352 of the second turbine assembly 208b within a quadrant of the second turbine assembly. By thus exposing some of the blades 352 of the turbine assemblies 208 to the wind, those turbine assemblies 208 will begin to rotate relative to the central axis 324 of the wind turbine assembly 104.

A determination may then be made as to whether the incident wind 404 has gusted or otherwise suddenly increased (step 1710). If the wind 404 has suddenly increased, the energy imparted to a blade 352 that is receiving a force from the wind 404 in excess of a predetermined amount is absorbed by the compliance units 908 included in the affected blade's 352 support structure 356 (step 1712). In particular, when the force on the blade 352 is sufficiently high, e.g., greater than a predetermined amount, the shaft 1004 of the compliance unit 908 is compressed against the resident member 1044. As can be appreciated by one of skill in the art after consideration of the present disclosure, the ability to absorb forces on the turbine assembly blades 352 caused by high winds protects the wind turbine system 100 components. In addition, the compliance units 908 protect the system 100 components from damage due to high winds, and in particular to sudden gusts or changes in wind speed, where the change in wind speed occurs too quickly to address through adjusting the shroud assemblies 204 to reduce the area of the turbine assemblies 208 exposed to the wind. At step 1714, a determination may be made as to whether the force of the wind causing the blade 352 to compress the associated compliance unit or units 908 has been removed. If the force has not yet been removed, the gust or increased wind continues to be absorbed by the compliance units 908. If the force of the gust or sudden increase in wind has been removed, the blade 352 is returned to its normal position (step 1716). In accordance with embodiments of the present invention, the blade 352 is returned to its normal position relative to the associated shaft 332, 344 in a measured manner. In particular, the force of the resilient member 1044 returns the shaft 1004 to its normal, fully extended position, while the movement of the piston 1012 through the fluid 1016, and the movement of the fluid 1016 through the holes 1032 of the equalization plate 1028 controls the rate at which the strut 1004 is returned to the extended position. As can be appreciated by one of skill in the art after consideration of the present disclosure, the blade 352 will be returned to its normal position relative to the associated shaft 332, 344 when the speed of the incident wind 404 has decreased by a sufficient amount, and/or when the blade has, through the rotation of the associated turbine assembly 208, rotated out of the wind.

At step 1720, a determination may be made as to whether an actionable change in either the wind velocity or the wind direction has been observed. If an actionable change in wind velocity or direction has been observed, the position of the shroud members 348 can be changed (step 1724). For instance, if the direction of the wind has changed by at least some minimum number of degrees, the shroud assemblies 204 can be rotated about the system axis 324 in the same direction such that the exposure of the first 208a and second 208b turbine assemblies to the wind remains equal or substantially equal. As an example, and without limitation, an actionable change can occur when the wind direction is more than 5° to either side of being equally incident on the shroud members 358. In response to a change in wind velocity, the shroud assemblies 204a and 204b can be rotated in opposite directions about the system axis 324 to change the exposure of the turbine assemblies 208 to the wind. Moreover, the rotational position of the shroud assemblies 204 can be changed in response to a combination of a change in the direction and a change in the velocity of the wind.

At step 1728, a determination may be made as to whether the power generation mode is to be continued. If power generation is to be continued, the process may return to step 1710. If the power generation mode is to be discontinued, the process may end.

As disclosed herein, a wind turbine system 104 in accordance with embodiments of the present invention includes counter-rotating turbine assemblies 208. In at least some embodiments, a first turbine assembly 208a includes a plurality of airfoils or blades that spin in a direction that is opposite the direction of spin of the second turbine assembly 208b, thus substantially canceling out the inertia or twisting motion that would otherwise be induced by the force of turning the turbine assemblies 208 in only one direction. In addition, the geometry of the first turbine assembly 208a blades 352 forces the incident wind 404 to not only turn the turbine assembly 204a, but in addition to direct excess wind load upward into the second turbine assembly 208b, thus acting similar to a two stage compressor and providing additional kinetic energy to move the second turbine assembly 208b. In addition, the blades 352 of the first turbine assembly 208a can be the mirror image of the blades 352 of the second turbine assembly 308b and can comprise lifting bodies. The number of blades included in the first turbine assembly 208a is generally different than the number of blades 352 included in the second turbine assembly 208b. As examples, from 5 to 13 blades 352 can be included any one turbine assembly 208.

The blades 352 may be made from a variety of different materials such as but not limited to metals, composites, plastics, combinations thereof, and the like. For example, the materials can include an ALUCOBOND™ composite material (an aluminum composite material that includes two sheets of aluminum thermo bonded to a polyethylene core), carbon composites, aluminum, galvanized metals, plastics or similar lightweight materials. The blades 352 may incorporate any of a number of different geometries and may comprise turbine blades, lifting bodies, airfoils, sails, and the like. In an exemplary configuration, the blades 352 can comprise a cambered surface that extends from about 10% to about 20% or higher from the side edges 812 and 816 of the blade 352. As a particular example, the cambered surface can extend about 12%. In addition, an airfoil 352 can incorporate a curve when considered in a front elevation view.

The shroud members 358 can comprise hemispherical aero shells. The shroud assemblies 204 incorporating the shroud members 358 can be formed from various materials. Suitable materials include ALCUBOND™ composite material, carbon composites, sheet metal, sheet screens, aluminum, plastics, or the like.

Exemplary generators 212 include three phase induction generators at various outputs, depending on the size and intended use of the wind turbine system 104. Exemplary power outputs include 60 KW, 120 KW, 200 KW, 500 KW and 700 KW production capacities. As can be appreciated by one of skill in the art after consideration of the present disclosure, a generator 212 can provide output power to an inverter system, for distribution of electricity into an electrical power bus or transformers of the user and the public utility grid. Accordingly, 60 Hz alternating current power can be provided by the wind turbine system 104, for use at the location of the wind turbine system 104, and/or for distribution by the public utility grid.

In an exemplary configuration, the turbine assemblies 208 have a radius from about 3 feet for a relatively small system to about 20 feet for a relatively large (e.g., 500 KW) system. The height of the overall wind turbine system 104 can range from about 14 feet for a small (e.g., 60 KW) system to about 50 feet for a large system. In one exemplary embodiment, an individual blade 352 has a total area of greater than 54 square feet, as determined by Euler's formula as known one of ordinary skill in the art, for converting wind power into work power based on surface area presented to the wind stream.

The operating revolutions per minute (RPM) of the turbine assemblies 208 can range from about 0 RPM to about 5,000 RPM and greater. For example, a wind turbine system 104 in accordance with embodiments of the present invention can be controlled to maintain rotation of the turbine assemblies 208 between about 3,000 RPM to about 6,500 RPM.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A wind turbine system, comprising:
  a base member;
  a first turbine assembly, wherein the first turbine assembly is interconnected to the base member, wherein the first turbine assembly is rotatable about a first axis in a first direction, wherein the first turbine assembly has a first outer circumference proximate to a first end of the first turbine assembly and a second outer circumference proximate to a second end of the first turbine assembly, and wherein the first outer circumference is smaller than the second outer circumference;

a second turbine assembly, wherein the second turbine assembly is interconnected to the base member, wherein the second turbine assembly is rotatable about the first axis in a second direction, wherein the second turbine assembly has a third outer circumference proximate to a first end of the second turbine assembly and a fourth outer circumference proximate to a second end of the second turbine assembly, wherein the third outer circumference is smaller than the fourth outer circumference, and wherein the second end of the first turbine assembly and the second end of the second turbine assembly are proximate to one another;

a first shroud assembly, including:
a first shroud member, wherein the first shroud assembly is interconnected to the base member, wherein the first shroud member extends at least partially around the outer circumferences of the first turbine assembly, wherein the first shroud assembly has a fifth inner circumference proximate to a first end of the first shroud assembly and a sixth inner circumference proximate to a second end of the first shroud assembly, wherein the fifth inner circumference is smaller than the sixth inner circumference, wherein the fifth inner circumference is larger than and proximate to the first outer circumference of the first turbine assembly, wherein the sixth inner circumference is larger than and proximate to the second outer circumference of the first turbine assembly, and wherein the first shroud member includes a first equatorial support member at the sixth inner circumference;

a second shroud assembly, including:
a second shroud member, wherein the second shroud assembly is interconnected to the base member, and wherein the second shroud member extends at least partially around the outer circumferences of the first turbine assembly, wherein the second shroud assembly has a seventh inner circumference proximate to a first end of the second shroud assembly and an eighth inner circumference proximate to a second end of the second shroud assembly, wherein the seventh inner circumference is smaller than the eighth inner circumference, wherein the seventh inner circumference is larger than and proximate to the third outer circumference of the second turbine assembly, wherein the eighth inner circumference is larger than and proximate to the fourth outer circumference of the second turbine assembly, wherein the second shroud member includes a second equatorial support member at the eight inner circumference, and wherein the first equatorial support member of the first shroud member is interconnected to the second equatorial support member of the second shroud member by an equatorial bearing assembly.

2. The system of claim 1, wherein the first turbine assembly includes a first plurality of blades, wherein the second turbine assembly includes a second plurality of blades, and wherein the number of blades included in the first plurality of blades is different than the number of blades included in the second plurality of blades.

3. The system of claim 2, further comprising:
a plurality of blade support structures, wherein each blade in the first plurality of blades and each blade in the second plurality of blades is associated with a support structure, each support structure including a compliance member, wherein in response to a force greater than a first predetermined amount, a radial position of a blade relative to an associated drive shaft is changed.

4. The system of claim 1, wherein in a first operational mode the first turbine assembly is configured to spin in a first direction around the first axis, and wherein in the first operational mode the second turbine is configured to spin in a second direction around the first axis.

5. The system of claim 1, wherein the first shroud member extends around at least one half of the outer circumference of the first turbine assembly, and wherein the second shroud member extends around at least one half of the outer circumference of the second turbine assembly.

6. The system of claim 1, wherein the first and second shroud assemblies are rotatable about the first axis.

7. The system of claim 1, further comprising:
a generator, wherein the first and second turbine assemblies are coupled to the generator by a drive train assembly.

8. The system of claim 1, wherein the base member includes:
a first circular end surface having a first diameter;
a second circular end surface having a second diameter;
a medial section having a third diameter, wherein the third diameter is smaller than the first diameter, and wherein the third diameter is smaller than the second diameter.

9. The system of claim 1, wherein the first shroud assembly defines a first exposed area of the first turbine assembly.

10. The system of claim 9, wherein the second shroud assembly defines a second exposed area of the second turbine assembly.

11. A method for providing a wind turbine system, comprising:
interconnecting a first turbine assembly to a base member, wherein the first turbine assembly is located and rotates about a first axis, and wherein the first turbine assembly is in a form of at least a partial first hemisphere centered on the first axis;
interconnecting a second turbine assembly to the base member, wherein the second turbine assembly is located and rotates about the first axis, wherein in a first operational mode the first and second turbine assemblies rotate in opposite directions, wherein the second turbine assembly is in a form of at least a partial second hemisphere centered on the first axis, and wherein the at least partial first and second hemispheres are aligned with one another to define a generally spherical shape;
selectively shielding a first portion of the first turbine assembly from a wind using a first shroud assembly, wherein the first shroud assembly partially shields at least a portion of the first turbine assembly, and wherein the first shroud assembly is located about the first axis;
selectively shielding a first portion of the second turbine assembly from the wind using a second shroud assembly, wherein the second shroud assembly partially shields at least a portion of the second turbine assembly, and wherein the second shroud assembly is located about the first axis; and
interconnecting the first and second shroud assemblies to one another with an equatorial bearing assembly, wherein the equatorial bearing assembly allows a rotational position of the first shroud assembly to be varied relative to a rotational position of the second shroud assembly.

12. The method of claim 11, further comprising:
in the first operational mode:
- selectively exposing a second portion of the first turbine assembly to the wind, wherein the first turbine assembly is rotated about the first axis in a first direction;
- selectively exposing a second portion of the second turbine assembly to the wind, wherein the second turbine assembly is rotated about the first axis in a second direction.

13. The method of claim 12, further comprising:
detecting a shift in the wind of at least a first predetermined amount;
changing a rotational position of the first shroud assembly about the first axis and changing a rotational position of the second shroud assembly about the second axis.

14. The method of claim 12, further comprising:
driving a generator using the first second and turbine assemblies.

15. The method of claim 12, further comprising:
experiencing a sudden increase in a force imparted to a blade of at least one of the first and second turbine assemblies;
in response to the force being at least a first predetermined amount, changing a radial position of the blade relative to other blades of the at least one of the first and second turbine assemblies.

16. The method of claim 15, further comprising:
in response to the force from the wind on the blade dropping below the first predetermined amount, returning the blade to a normal position relative to the other blades in the at least one of the first and second turbine assemblies.

17. A wind turbine system, comprising:
a base member;
a generator interconnected to the base member;
a first shroud assembly interconnected to the base member, the first shroud assembly including a first shroud member, wherein the first shroud member can be rotated about a system axis to change a location of the first shroud member about the system axis;
a second shroud assembly interconnected to the first shroud assembly, the second shroud assembly including a second shroud member, wherein the second shroud member can be rotated about the system axis to change a location of the second shroud member about the system axis, wherein the first and second shroud assemblies define at least portions of a surface of a spherical volume, and wherein the first and second shroud assemblies are interconnected to one another by an equatorial bearing assembly;
a first turbine assembly interconnected to the generator by a drive train assembly, wherein the first turbine assembly is located in a first hemisphere of the spherical volume defined by the first and second shroud assemblies, and wherein the first shroud member partially encloses the spherical volume in at least a first area adjacent the first turbine assembly;
a second turbine assembly interconnected to the generator by the drive train assembly, wherein the second turbine assembly is located in a second hemisphere of the spherical volume defined by the first and second shroud assemblies, wherein the second shroud member partially encloses the spherical volume in at least a second area adjacent the second turbine assembly.

18. The system of claim 17, further comprising:
a controller, including a processor and at least a first sensor, wherein the controller is operable to control the location of the first and second shield members about the system axis in response to information from the at least a first sensor.

19. The system of claim 17, further comprising:
a plurality of blades,
wherein the first turbine assembly includes a first plurality of blades;
wherein the second turbine assembly includes a second plurality of blades.

20. The system of claim 17, wherein at least a first flow path is defined by the first shroud, wherein the first flow path intersects the first turbine assembly, and wherein the first flow path also intersects the second turbine assembly.

* * * * *